(12) United States Patent
Amass

(10) Patent No.: US 12,089,539 B1
(45) Date of Patent: Sep. 17, 2024

(54) BULK MATERIAL HANDLING ACCESSORY FOR LANDSCAPING DEVICE

(71) Applicant: Michael B. Amass, Wooster, OH (US)

(72) Inventor: Michael B. Amass, Wooster, OH (US)

(*) Notice: Subject to any disclaimer, the term of this patent is extended or adjusted under 35 U.S.C. 154(b) by 307 days.

(21) Appl. No.: 17/681,101

(22) Filed: Feb. 25, 2022

Related U.S. Application Data

(60) Provisional application No. 63/155,860, filed on Mar. 3, 2021.

(51) Int. Cl.
| | |
|---|---|
| *B65G 47/20* | (2006.01) |
| *A01D 42/00* | (2006.01) |
| *A01G 13/02* | (2006.01) |
| *B01F 27/2322* | (2022.01) |
| *B01F 27/93* | (2022.01) |
| *B01F 31/441* | (2022.01) |
| *B01F 35/32* | (2022.01) |
| *B65G 47/18* | (2006.01) |
| *B65G 65/48* | (2006.01) |

(52) U.S. Cl.
CPC ........ *A01G 13/0287* (2013.01); *A01D 42/005* (2013.01); *A01G 13/0262* (2013.01); *B01F 27/2322* (2022.01); *B01F 27/93* (2022.01); *B01F 31/441* (2022.01); *B01F 35/325* (2022.01); *B65G 47/18* (2013.01); *B65G 65/4818* (2013.01)

(58) Field of Classification Search
None
See application file for complete search history.

(56) References Cited

U.S. PATENT DOCUMENTS

| | | | | |
|---|---|---|---|---|
| 2,834,487 A | * | 5/1958 | Gaddis | B60P 1/36 198/607 |
| 3,401,890 A | * | 9/1968 | Middlesworth | A01M 11/00 239/662 |
| 3,776,431 A | * | 12/1973 | Riley | E01C 19/203 60/431 |
| 3,790,090 A | * | 2/1974 | Lorenc | B60P 1/38 239/666 |

(Continued)

FOREIGN PATENT DOCUMENTS

WO    WO-2021163748 A1 *  8/2021

*Primary Examiner* — Joseph A Dillon, Jr.
(74) *Attorney, Agent, or Firm* — Ralph E. Jocke; WALKER & JOCKE

(57) ABSTRACT

An accessory configured to be connected to a self-propelled landscaping device. The accessory includes a frame that is releasably connectable to the device. The accessory includes a hopper supported on the frame and configured to hold bulk material in an interior area thereof. The hopper includes an upper opening for receiving bulk material and a lower opening for discharging the material. A conveyor extends below the hopper. The conveyor is selectively operative to move bulk material discharged from the lower opening in a first direction toward a conveyor first end or in a second direction toward a conveyor second end. A spreader is configured to engage and propel bulk material that is discharged at the conveyor first end. A conveyor extension is movably mounted on the frame and that includes an outward end that is selectively positionable outward in the second direction. Material delivered from the conveyor second end is movable on the conveyor extension and discharged at the outward end.

24 Claims, 28 Drawing Sheets

(56) References Cited

U.S. PATENT DOCUMENTS

| | | | | |
|---|---|---|---|---|
| 4,212,428 A * | 7/1980 | Walker | A01C 17/005 | 239/677 |
| 4,367,848 A * | 1/1983 | Ehmke | A01C 17/006 | 239/665 |
| 5,090,550 A * | 2/1992 | Axmann | B65G 21/10 | 198/313 |
| 5,186,396 A * | 2/1993 | Wise | E01H 10/007 | 239/677 |
| 5,244,333 A * | 9/1993 | Byrne | E01H 1/106 | 15/83 |
| 5,976,011 A * | 11/1999 | Hartman | A01F 12/40 | 460/111 |
| 6,220,532 B1 * | 4/2001 | Manon | A01C 17/001 | 239/681 |
| 6,502,771 B1 * | 1/2003 | Wyne | A01C 17/001 | 239/661 |
| 6,715,696 B2 * | 4/2004 | Pierce | E01C 19/203 | 239/668 |
| 6,817,552 B2 * | 11/2004 | Kinkead | A01C 17/001 | 239/668 |
| 7,748,652 B2 * | 7/2010 | Musso | E01C 19/203 | 239/722 |
| 7,980,484 B1 * | 7/2011 | Podoll | A01C 15/122 | 222/196 |
| 9,629,309 B2 * | 4/2017 | Hoppel | A01D 43/00 | |
| 10,306,826 B2 * | 6/2019 | Owenby | A01C 17/001 | |
| 10,401,212 B2 * | 9/2019 | Alexander | G01G 11/08 | |
| 10,721,876 B1 * | 7/2020 | Schmutz | E01C 19/205 | |
| 10,759,610 B1 * | 9/2020 | Allegretti | B65G 47/16 | |
| 2009/0297311 A1 * | 12/2009 | Mensch | B60P 1/36 | 414/502 |
| 2010/0133365 A1 * | 6/2010 | Bailey | E01H 1/0809 | 239/663 |
| 2014/0286739 A1 * | 9/2014 | Helmsderfer | E01C 19/2045 | 414/528 |
| 2017/0190275 A1 * | 7/2017 | Helmsderfer | E01C 19/203 | |
| 2022/0081228 A1 * | 3/2022 | Johnson | A01C 7/081 | |

* cited by examiner

BULK MATERIAL HANDLING ACCESSORY FOR LANDSCAPING DEVICE

TECHNICAL FIELD

Exemplary arrangements relate to bulk material handling devices. Exemplary arrangements specifically relate to a bulk material transport and spreader accessory that can be releasably mounted on a self-propelled landscaping device.

BACKGROUND

In landscaping activities it is common to apply bulk materials in selected areas. This may include for example, spreading mulch around trees and other plants. Mulch or other bulk materials may be used as a bedding material in flower beds or in other areas to reduce the growth of weeds or other unwanted vegetation. Bulk materials such as mulch or small stones may also be placed in selected areas such as on or adjacent to walking paths, or adjacent to buildings or other structures.

Commonly such bulk materials may be provided in bags. In other situations the material may be delivered by the truckload. The material must be moved to the area where it will be permanently placed. The material is commonly spread by hand or using a rake or similar tools. The transport and placement of bulk materials can be a strenuous and time-consuming activity.

The current approaches for transporting and spreading bulk materials may benefit from improvements.

SUMMARY OF THE DISCLOSURE

Exemplary arrangements include an accessory for a self-propelled landscaping device that is configured to be operatively releasably connected to the self-propelled landscaping device. The accessory generally includes a body with a frame that is configured to be operatively releasably attached in fixed connection with the self-propelled landscaping device through suitable connection means.

The exemplary accessory further includes a hopper that is in operatively supported connection with the frame. The hopper is configured to hold bulk material in an interior area of the hopper. The hopper further includes a wall or a plurality of walls that bound the hopper interior area, and that bound an upper opening of the hopper and a lower opening of the hopper. Bulk material is enabled to be received into the interior area of the hopper through the upper opening and to be discharged from the interior area of the hopper through the lower opening.

The exemplary accessory further includes a movable conveyor. The movable conveyor is in operatively supported connection with the frame and extends horizontally below the hopper lower opening. The movable conveyor includes a first end and a second end that is opposed of the first end. The exemplary conveyor is selectively movable in a first direction in which bulk material discharged from the lower opening of the hopper is moved by the conveyor toward the first end of the conveyor. The exemplary conveyor is also selectively movable in a second direction in which bulk material discharged from the lower opening of the hopper is moved toward the second end of the conveyor.

The exemplary accessory further includes at least one rotatable spreader member. The exemplary spreader member is in operatively supported rotatable connection with the frame and is disposed from the hopper in the first direction. The exemplary spreader member includes a plurality of projections that are configured to engage bulk material and to propel bulk material that has been moved by the conveyor in the first direction away from the conveyor.

The exemplary accessory further includes a conveyor extension that is movably mounted in operatively supported connection with the frame. The exemplary conveyor extension includes an inward end and an outward end. The outward end of the exemplary conveyor extension is selectively positionable horizontally outward in the second direction away from the hopper.

In exemplary arrangements bulk material in the hopper interior area is discharged through the lower opening onto the conveyor. The bulk material on the conveyor is selectively movable in engagement with the conveyor in either the first direction or in the second direction. When the conveyor is operated to move in the first direction the bulk material is moved toward the first end of the conveyor and is caused to engage the plurality of projections of the spreader member. The material is propelled away from the accessory responsive to rotation of the spreader member. When the conveyor is operated to move in the second direction the bulk material that is moved toward the second end of the conveyor, engages the conveyor extension and is discharged at the outward end of conveyor extension.

Numerous additional features and relationships of exemplary arrangements are discussed in the Detailed Description that follows.

DETAILED DESCRIPTION

Figure 1:
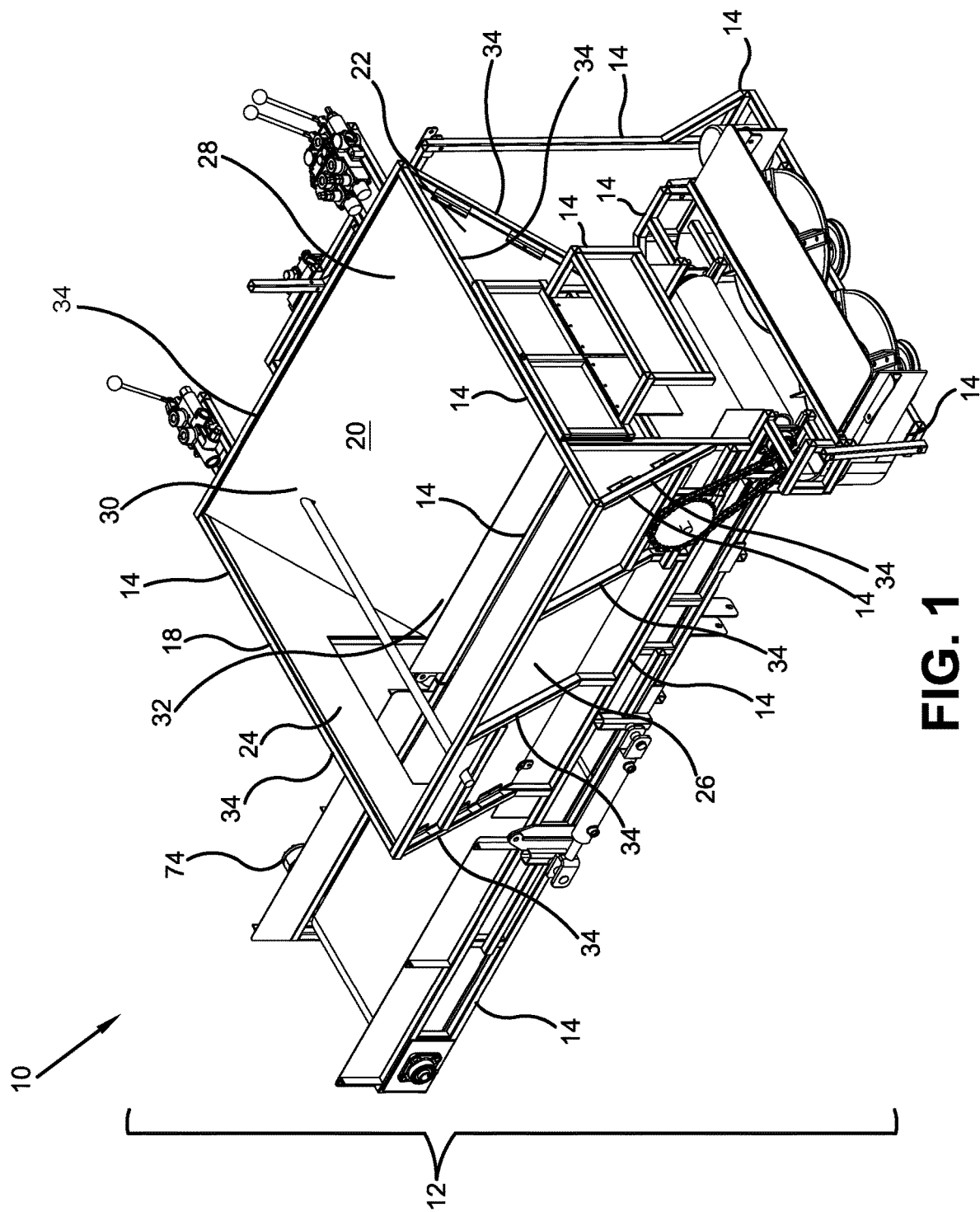
FIG. 1 is a front top right perspective view of an exemplary accessory.

Referring now to the drawings and particularly to FIG. 1, there is shown therein an exemplary accessory 10. In exemplary arrangements, the exemplary accessory 10 is configured to be operatively connected to a self-propelled landscaping device 16, shown in part in FIG. 26 and FIG. 28. It should be understood that the term self-propelled landscaping device 16 includes any movable machine or device used in association with landscaping or other similar activities. The term self-propelled landscaping device includes, for example, but is not limited to lawnmowers, tractors, carts, utility terrain vehicles (UTVs), recreational terrain vehicles (RTVs), skid steer loaders, compact track loaders, multi-terrain loaders, backhoes, front end loaders, or other mobile devices enabled to facilitate the carrying out of landscaping or similar activities. In exemplary arrangements, for example, the accessory 10 is operatively removably mounted on a frame of a stand-on device that includes a step 17 configured to support a standing operator during device movement. For example in some exemplary arrangements the self-propelled landscaping device may include a Toro® Grandstand® Multiforce™ device or other similar device. However, in other exemplary arrangements, the accessory 10 may be removably mounted to a frame or other portion of another type of self-propelled landscaping device in such a way so as to not impede the movement, balance, or function thereof.

As shown in FIG. 1, the exemplary accessory 10 includes a body 12 that generally includes various components and structures of the accessory 10. The body 10 of the device includes a frame 14. The various structures and components of the accessory 10 that will be described herein are in operatively supported, and in some arrangements in operatively movable connection with the exemplary frame 14. The exemplary frame 14 is comprised of a generally rigid and strong supporting material that is sufficient to support the various components and structures of the accessory 10, and to be securely releasibly attached and/or fastened to the self-propelled landscaping device 16. In exemplary arrangements, the exemplary frame 14 is comprised of a metal material having a weight that does not substantially impede the drive, power, or output of the self-propelled landscaping device 16. For example, in exemplary arrangements, the frame 14 may be comprised of a metal, rigid plastic, composite or other suitable material suitable to support the various components and structures of the accessory 10, and to be securely releasably attached or connected to the self-propelled landscaping device 16. In some exemplary arrangements, the exemplary frame 14 may include portions thereof that are movable relative to other portions of the frame 14.

In exemplary arrangements, the frame 14 is configured such that the various components and structures of the accessory 10 can be operatively secured, connected, or attached thereto. In some exemplary arrangements, the frame 14 is configured such that the various components and structures of the accessory 10 may be in operative releasable connection therewith. For example, the exemplary frame 10 includes a plurality of openings therein to accept screws, bolts, pins, rivets or other fasteners used to secure the various components or structures of the accessory 10 to the frame 14. However, other fastening means or methods for operatively fixing, attaching, or connecting, the various components and structures of the accessory 10 to the frame 14 may be used. As used herein, the terms fastening means and connecting means include the use of, but not limited to, screws, bolt and nut arrangements, washers, rivets, brackets, notch and projection arrangements, interlocking edges, clips, adhesives, or any other suitable fastening, connecting, fixing, or securing means, or combinations thereof. Additionally, in some exemplary arrangements, the various components and structures of the accessory 10 may be integrally formed with the frame 14. However, it should be understood that these are merely exemplary frame arrangements, and in other arrangements, other frame configurations may be used.

Still referring to FIG. 1, the exemplary body 12 further includes a hopper 18. The exemplary hopper 18 comprises a container or bin suitable for housing solid bulk material within an interior area 20 thereof. As used herein, bulk material comprises a material that is used in large quantities for landscaping or other similar purposes, and that needs to be transported and/or spread. However, as can be appreciated, the exemplary accessory 10 may be used for transport and/or spreading of materials not typically associated with landscaping purposes. Exemplary arrangements described herein are related to the transport and spreading of solid bulk material including, but not limited to, mulch, stones, sand, dirt, soil, straw, grass seed, fertilizer, manure, pesticides, nutrients, weed retardants, or combinations thereof. The exemplary hopper 18 may be a container or bin of a suitable shape or size. For example, the exemplary hopper 18 may have the shape of a rectangle, a square, a circle, a barrel, a cone, a cylinder, or other shape suitable for containment and transportation of the bulk material.

In exemplary arrangements, the exemplary hopper 18 includes a first end wall 22 and an opposed second end wall 24. The exemplary hopper 18 further includes a front wall 26 and a rear wall 28. The front wall 26 and the rear wall 28 extend between the first end wall 22 and the second end wall 24. In exemplary arrangements, the front wall 26 and the rear wall 28 extend generally perpendicularly to the first end wall 22 and the second end wall 24. The exemplary first end wall 22, second end wall 24, front wall 26, and rear wall 28 bound the hopper interior area 20. However, it should be understood that these wall arrangements of the hopper are merely exemplary, and in other arrangements, other hopper wall configurations may be used. For example, in some arrangements the hopper wall may comprise one continuous circular or conical wall that bounds the hopper interior area.

In exemplary arrangements, the hopper end walls 22 and 24, and the front and rear hopper walls 26 and 28 bound a hopper upper opening 30. The exemplary hopper upper opening 30 is of sufficient width and length/size to enable the interior area 20 of the hopper to receive a selected volume of solid bulk material therein. The hopper end walls 22 and 24 and the front and rear hopper walls 26 and 28 further bound a hopper lower opening 32. The exemplary hopper lower opening 32 is also of sufficient width and length/size to enable bulk material within the interior area 20 of the hopper to be discharged and passed downward from within the interior area through the lower opening 32.

In some exemplary arrangements, the area of the lower opening 32 of the hopper may be varied such that the rate at which the bulk material is discharged from the interior area 20 is enabled to be controlled. The lower opening 32 may have an associated structure that enables selectively varying the area of the opening. The area of the lower opening may be set at a certain size corresponding to a certain volume rate to be discharged or corresponding to a certain depth of bulk material that is to be spread. In such exemplary arrangements, the lower opening 32 may include suitable structures in operative connection therewith that are configured to control the flow, movement, rate and/or volume of bulk material that is discharged from the interior area 20 through the lower opening 32. For example, the lower opening 32 may include sliding plates in operative connection therewith that are enabled to be variably spaced apart by one or more actuators, such as hydraulic cylinders or motors, to vary the area of the lower opening and allow different flows or volumes of bulk material to be discharged from the interior area 20. The lower opening 32 may be associated with a plurality of doors or openings with movable closures that enable the flow or volume of bulk material discharged from the interior area 20 to be selectively varied. Alternatively in some arrangements a vertical distance between the lower opening and a conveyor belt or other structure below the lower opening may be selectively variable to control an amount or rate of bulk material that may leave the hopper through the lower opening. In other exemplary arrangements depending on the size and flow properties of the bulk material, the rate of flow of the material out of the lower opening may be controlled by controlling the movement of an underlying conveyor that carries the material away from the opening in a manner like that later discussed. However, these arrangements of the lower opening 32 and associated structures and actuators are merely exemplary, and in other arrangements, other lower opening configurations may be used. Additionally, other structures that are suitably configured to control the flow rate or volume of bulk material discharged by varying the area of the lower opening, or other means of controlling the discharge of bulk material may be used.

Referring again to FIG. 1, in some exemplary arrangements, the exemplary front and rear walls 26 and 28 are tapered to extend closer together with an increase in proximity to the lower opening, as the front and rear walls 26 and 28 extend vertically from the hopper upper opening 30 to the hopper lower opening 32. However, in other exemplary arrangements, the front and rear walls 26 and 28 may not be tapered, or the rear walls 26 and 28 and the end walls 22 and 24 may all be tapered from the upper opening 30 to the lower opening 32. Still further, in other exemplary arrangements, the hopper 18 may comprise one continuous wall that extends vertically without taper or that is tapered so as to be in closer proximity to the opposed side of the continuous wall from the hopper upper opening 30 with increased proximity to the hopper lower opening 32. However, these configurations and arrangements of the hopper and hopper walls are merely exemplary, and in other exemplary arrangements, other hopper and hopper wall arrangements may be used.

The exemplary hopper 18 is in operatively supported connection with the frame 14. In some exemplary arrangements, the frame 14 includes hopper wall support members 34. The exemplary hopper wall support members 34 extend along the walls 22, 24, 26, and 28 in operatively abutting supporting contacting relation therewith. The exemplary hopper wall support members 34 may be secured or connected to the hopper walls 22, 24, 26, and 28 through suitable fastening means or connecting means. In other exemplary arrangements, the hopper wall support members 34 may be integrally formed with the hopper walls. The exemplary hopper wall support members 34 are comprised of a suitable material which may be similar to the material of frame 14. The exemplary hopper wall support members 34 are operative to prevent the walls 22, 24, 26, and 28 of the hopper 18 from bending, flexing, or breaking as a result of the weight of the bulk material present within the interior area 20.

Figure 2:
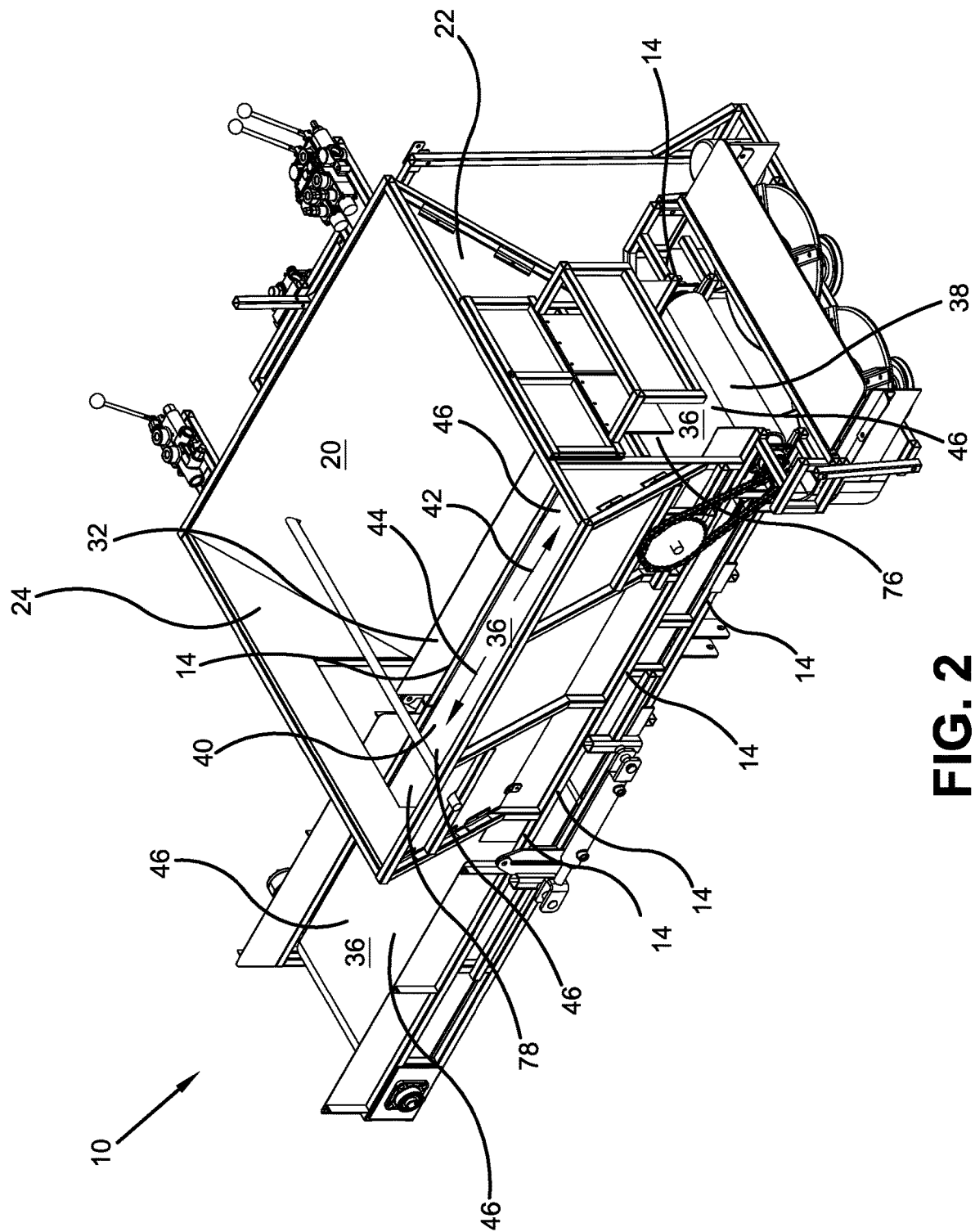
FIG. 2 is a front top right perspective view of an exemplary accessory showing the first and second directions in which bulk material may be moved on the exemplary conveyor.

Now referring to FIG. 2, the exemplary accessory 10 further includes at least one movable conveyor 36. The exemplary conveyor 36 is in operatively supported connection with the frame 14. In an operative position of the accessory 10, when it is attached to the self-propelled landscaping device 16, the exemplary conveyor 36 extends horizontally below the hopper lower opening 32. The exemplary conveyor 36 comprises a type of conveyor that is operative to move bulk material that is discharged from the interior area, in selected horizontal directions. For example, the exemplary conveyor 36 may comprise a belt conveyor, a chute conveyor, a gravity roller conveyor, a powered roller conveyor, a bucket conveyor, a ball transfer conveyor, a slat conveyor, a chain conveyor, a trolley conveyor, a vibrating conveyor, a trough belt conveyor, a screw/auger conveyor, or a moving wheel conveyor as appropriate for moving the particular type of bulk material. However, it should be understood that these conveyor types and means for selectively moving the bulk material after discharge from the interior area 20 of the hopper 18 are merely exemplary, and other means or conveyor systems for transporting the bulk material in the selected directions after discharge from the hopper 18 may be used.

In the exemplary arrangements, the conveyor 36 includes a first conveyor end 38 and a second conveyor end 40. The exemplary first conveyor end 38 is positioned adjacent and vertically below the first end wall 22 of the hopper 18. The exemplary second conveyor end 40 is positioned adjacent and vertically below the second end wall 24. The exemplary conveyor 36 extends horizontally intermediate of the end walls 22 and 24 of the hopper 18. Additionally, in some exemplary arrangements, the exemplary conveyor 38 extends in a plane that is generally perpendicular to the relatively vertical plane in which the exemplary end walls of the hopper 18 extend. In some exemplary arrangements, the conveyor 36 may extend horizontally outward from the hopper 18 beyond the first end wall 22 and in the opposed direction beyond the second end wall 24.

Still referring to FIG. 2, the exemplary conveyor 36 is selectively reversibly horizontally movable in a first conveyor direction as indicated by arrow 42, and in a second conveyor direction as indicated by arrow 44. The exemplary conveyor extends in each of the first conveyor direction and the second conveyor direction beyond the lower opening of the hopper. As shown in FIG. 2, the exemplary conveyor 36 extends in the second direction 44 beyond the second end wall 24. However, in alternative exemplary arrangements, the exemplary conveyor 36 may not extend beyond the second end wall 24, or may be in aligned relation therewith. The exemplary conveyor 36 is configured such that bulk material within the interior area 20 of the hopper 18 is enabled to be discharged from the interior area 20 and pass through the lower opening 32 of the hopper 18 onto an upper surface 46 of the conveyor 36. The upper surface 46 includes a material receiving and engaging portion that is in facing relation with the interior area of the hopper 18. The upper surface 46 of the conveyor 36 may alternatively be referred to herein as an upper flight, or an upper run, of the conveyor. However, in some exemplary arrangements including other conveyor types as described above, the upper surface 46 may comprise a trough or other surface in which the exemplary conveyor structure and function are enabled to operate in an efficient manner to move bulk material in engagement therewith selectively either in the first direction 42 or in the opposed second direction 44 away from the lower opening of the hopper.

In some exemplary arrangements, the exemplary hopper 18 includes openings in the end walls thereof. As shown in FIG. 2, the hopper end wall 22 includes an opening 76 and the hopper end wall 24 includes an opening 78 therein. In exemplary arrangements, the openings 76 and 78 extend in the respective hopper end wall 22 and 24 generally perpendicularly to the generally horizontally extending plane in which the conveyor 36 extends. Further, the exemplary openings 76 and 78 are arranged such that the conveyor 36 extends generally linearly between the openings 76 and 78 such that the conveyor 36 is in aligned relation with the openings 76 and 78. Alternatively, in some arrangements, the conveyor 36 extends through the openings 76 and 78 such that the first end 38 and second end 40 of the conveyor extend outside of the hopper interior area 20. In exemplary arrangements, the exemplary openings 76 and 78 are of suitable size or shape to allow the bulk material transported on the conveyor 36 in either direction 42 or 44 to move outside of the hopper interior area 20 through the respective opening 76 or 78. In some exemplary arrangements the openings in the side walls may have associated movable plates or other structures associated therewith. Such structures may be selectively movable and positionable to vary the area of the side openings. In connection with handling of certain bulk materials it may be desirable to set the areas of the associated side openings to facilitate passage of the bulk material from the hopper from both the lower opening and the side openings. Of course it should be understood that these approaches are exemplary and in other arrangements other approaches may be used.

Figure 3:
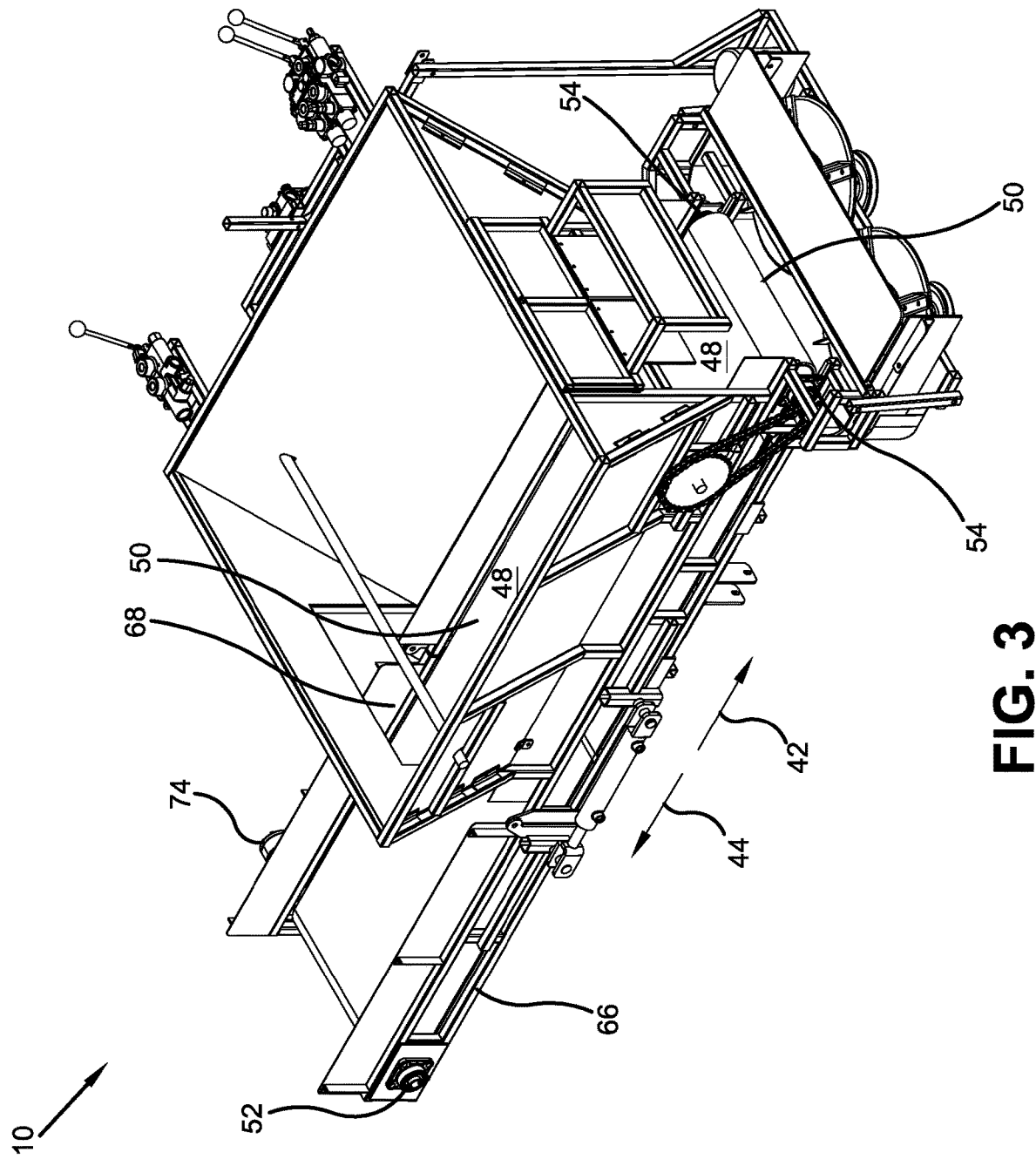
FIG. 3 is a front top right perspective view of an exemplary accessory showing an exemplary belt conveyor.
Figure 4:
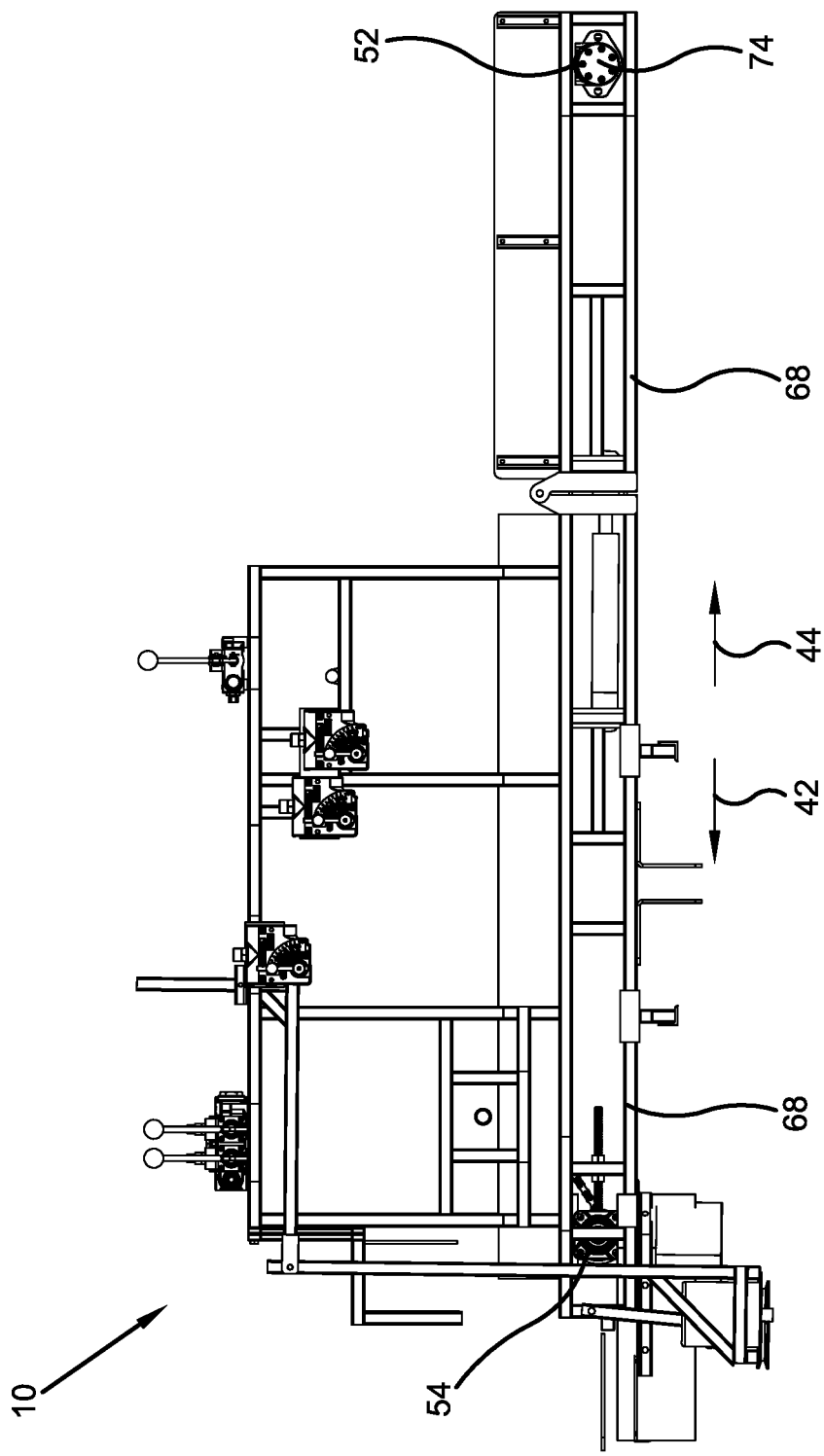
FIG. 4 is a back view of the exemplary accessory showing exemplary pulleys of the exemplary belt conveyor.
Figure 5:
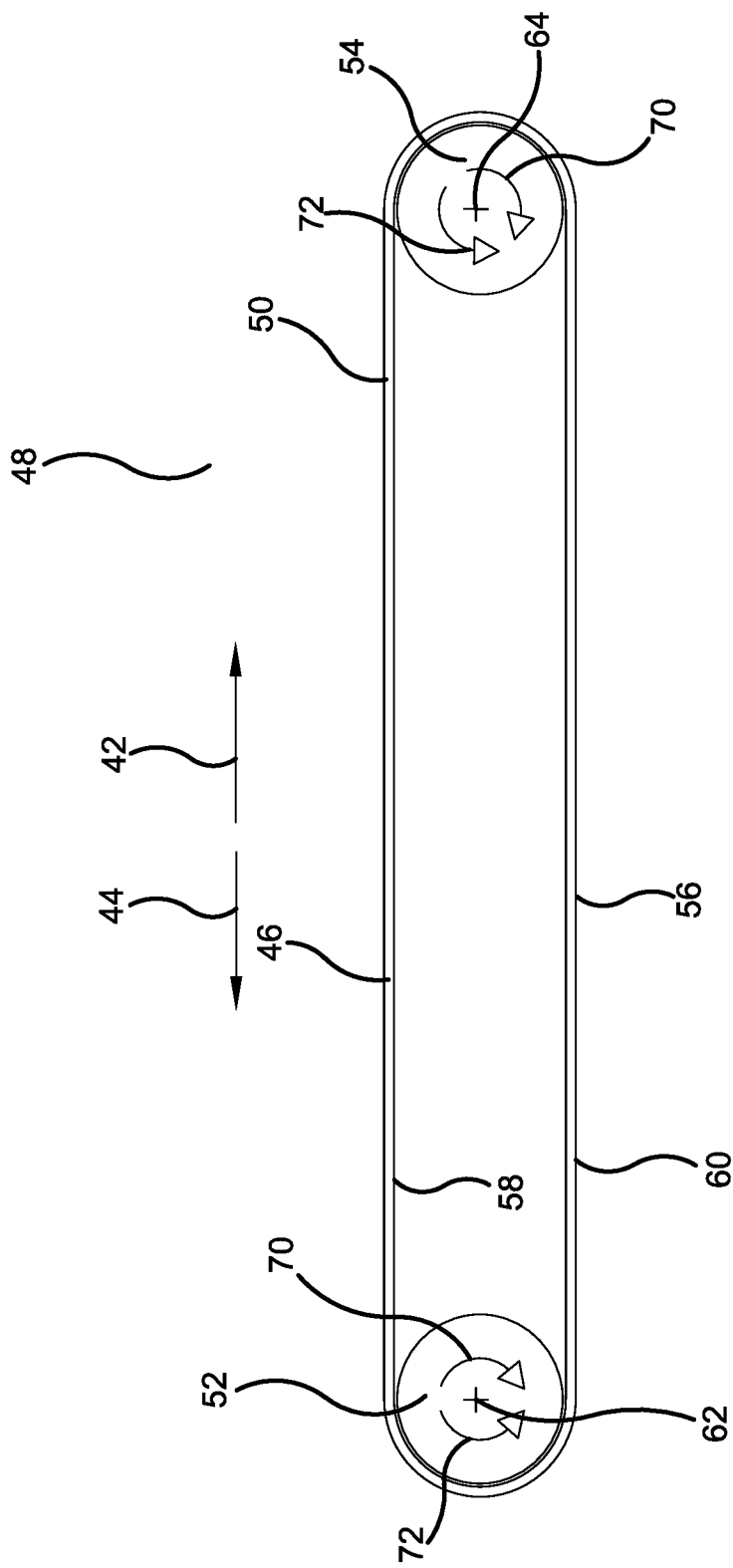
FIG. 5 is a front cross-sectional view of the exemplary belt conveyor.

Referring now to FIGS. 3-5, there is shown therein an exemplary accessory 10 in which the exemplary conveyor 36 comprises a belt conveyor 48. The exemplary belt conveyor 48 includes a belt 50 and a plurality of supporting rolls which are alternatively referred to herein as pulleys 52 and 54. The exemplary belt 50 comprises a continuous loop of flexible durable material. The material of exemplary belt 50 may be, for example, rubber, a flexible plastic, a flexible composite material or other material suitable to transport the bulk material on the upper surface of the flight/run 46 thereof in either direction 42 or 44. The exemplary belt 50 is sufficiently flexible to turn and partially surround and move about an outer circumference of the pulleys 52 and 54. The exemplary belt 50 of the belt conveyor 48 additionally includes a lower return flight/run 56 as shown for example in FIG. 5. Additionally, as also shown in FIG. 5, the belt 50 includes an inside surface 58 and an opposed outside surface 60.

The exemplary pulleys 52 and 54 are in operatively supported connection with the frame 14. The exemplary pulleys 52 and 54 are rotatable relative to the frame 14 about respective axes 62 and 64. In the exemplary arrangement, the exemplary pulleys 52 and 54 comprise elongated cylinders of generally rigid durable material. The pulleys extend generally horizontally and perpendicular to the first and second directions 42 and 44, and between a front portion 66 of the frame 14 and a back portion 68 of the frame 14. The inside surface 58 of the exemplary belt 50 extends in surrounding contacting relation of the pulleys 52 and 54. In exemplary arrangements, the exemplary belt 50 is engaged in generally taut relation between the pulleys 52 and 54. This may be accomplished using suitable tensioning rolls or biasing springs in operative connection with one or both pulleys. The exemplary pulleys 52 and 54 are selectively rotatable in a first rotational direction indicated by arrows 70 and in a reverse, opposed second rotational direction indicated by arrows 72. When the pulleys 52 and 54 rotate in the first rotational direction 70, the upper run of the conveyor belt 48 is caused to move in the first direction 42. As such, bulk material discharged from the lower opening 32 of the hopper 18 onto the outside surface of the upper run 46 is moved in engagement the belt 50 toward the first end 38 of the conveyor 36. Conversely, when the pulleys 52 and 54 rotate in the second rotational direction 72, the conveyor belt 48 is caused to move in the second direction 44. As such, bulk material discharged from the lower opening 32 of the hopper 18 onto the conveyor upper run 46 is moved by the belt 50 toward the second end 40 of the conveyor 36. It should be understood that this belt conveyor arrangement is merely exemplary, and in other exemplary arrangements, other conveyor arrangements may be used.

Figure 6:
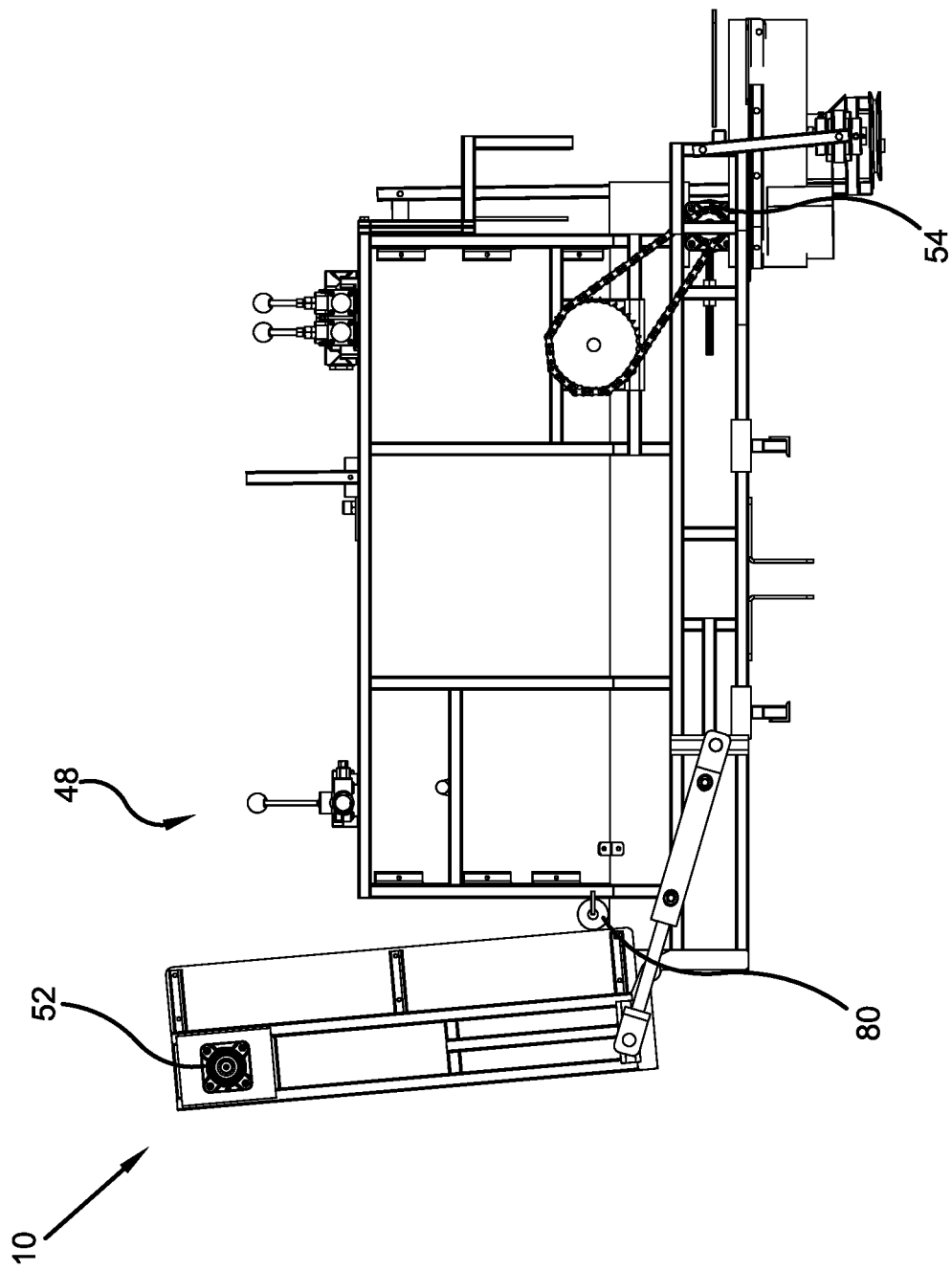
FIG. 6 is a front view of the exemplary accessory including the exemplary belt conveyor and exemplary guide pulleys.

As can be appreciated, other exemplary pulleys, rollers or guiding structures may be included in operative supported connection with the frame 14 to direct the path of travel of the belt 50, and/or to help guide the belt 50 around bends, turns, or angles of the belt conveyor 48. For example, in some exemplary arrangements, the belt conveyor 48 may include guides or directing pulleys or rollers such that portions of the conveyor belt 48 may extend at angles between 0° and 90°, or greater, relative to the substantially horizontal portion of the exemplary conveyor belt 48. When used herein substantially horizontal shall mean varying by no more than plus or minus 30 degrees from the horizontal direction. Such an example is shown in FIG. 6, in which the exemplary accessory 10 includes the exemplary belt conveyor 48. The belt conveyor 48 includes a guiding pulley/roller 80 that is operative to facilitate the path of travel of belt 50 through the generally right-angled bend of the belt 50 of the belt conveyor 48. However, as can be appreciated, in other exemplary arrangements, other conveyor structures may be used as well as other means for guiding or directing the path of travel of the conveyor 36, including multiple guiding pulleys/rollers or other conveyor belt guiding structures.

In some exemplary arrangements, the exemplary conveyor 36 is operatively configured to be caused to move in the first direction 42 or in the second direction 44 by a conveyor motor 74. The exemplary conveyor motor 74 may be a suitable motor with rotational output that is operative to cause the conveyor 36 to move in directions 42 or 44. In exemplary arrangements including the belt conveyor 48, the exemplary motor 74 is in operative direct driving connection with one or both of the pulleys 52 and 54 such that selective operation of the motor is operative to cause selective rotation of both the pulleys 52 and 54 in either selected rotational direction 70 or 72, thereby causing movement of the conveyor belt 48 in either direction 42 or 44, respectively. In other exemplary arrangements, the motor may be in operative direct driving connection with only one of the pulleys 52 and 54 such that selective operation of the motor is operative to cause selective driving rotation of the one of the pulleys, thereby causing movement of the conveyor belt 48 in either direction 42 or 44, and contemporaneously driven rotation of the other pulley 52 or 54 in the same direction as the directly motor driven pulley, as a result of the inside surface 58 of the belt 50 being in contacting relation with the non-motor driven pulley 52 or 54. The driven pulley that is not in direct driven connection with the motor may be alternatively referred to herein as an idler pulley. As can be appreciated, these methods and arrangements for causing the conveyor 36 to move in either direction 42 or 44 is merely exemplary, and in other exemplary arrangements, other methods or approaches for moving the conveyor selectively in each of the directions may be used.

Figure 7:
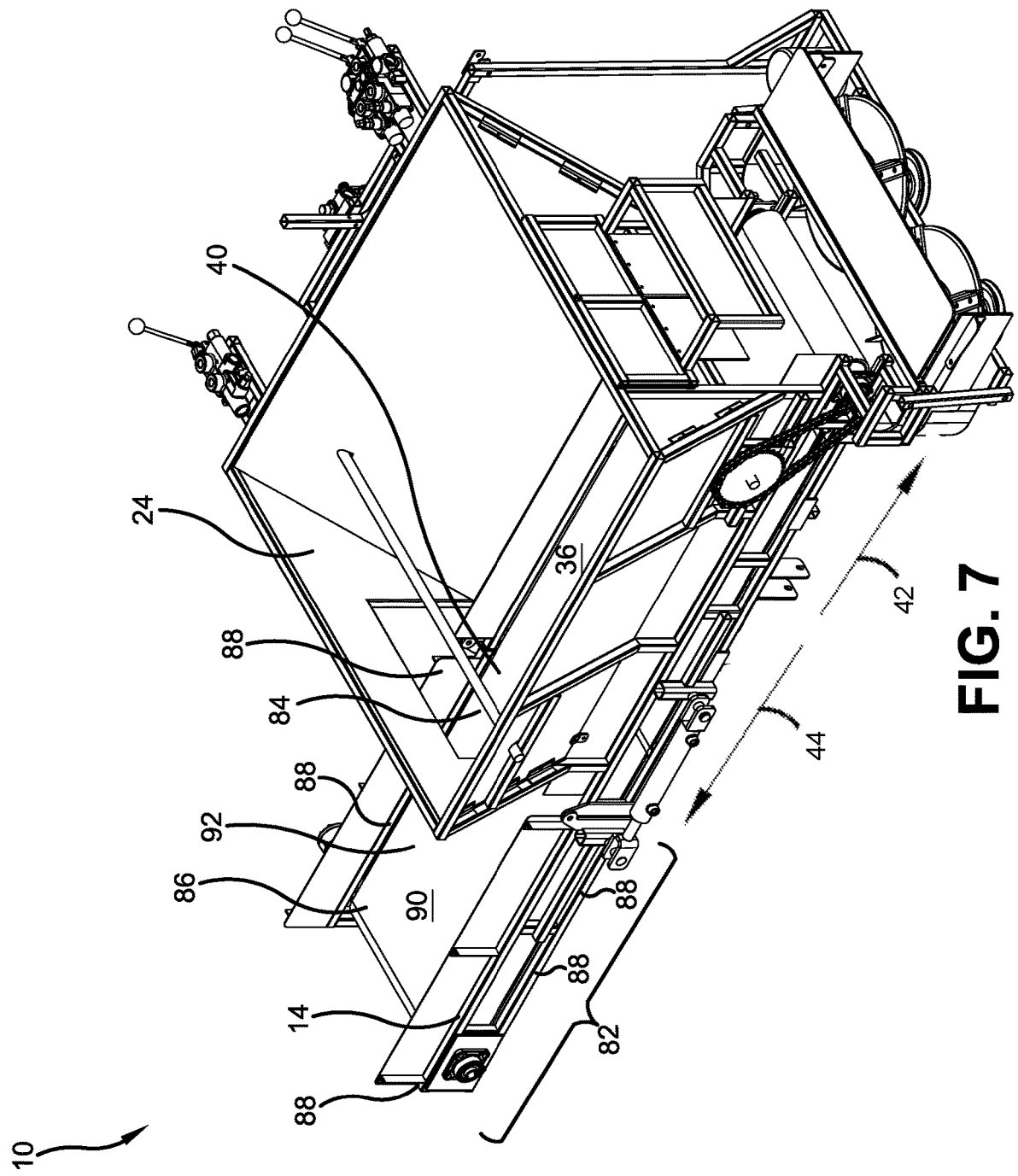
FIG. 7 is a front top right perspective view of the exemplary accessory showing the exemplary conveyor extension.

Now referring to FIG. 7, there is shown therein an accessory 10 as previously described. The exemplary accessory 10, in some arrangements, includes a conveyor extension 82. The exemplary conveyor extension 82 includes a conveyor extension frame portion 88. The conveyor extension frame portion 88 may be considered herein as included as part of the frame 14, or as a separate component. The conveyor extension frame portion 88 is operative to support the various components and structures associated with the conveyor extension 82. In exemplary arrangements, the conveyor extension 82 includes an inward end 84 and an outward end 86. The conveyor extension frame portion 88 at the inward end 84 is movably mounted in operative connection with the frame 14 and is positioned adjacent to the second end wall 24 of the hopper 18. The inward end 84 of the conveyor extension 82 is also positioned adjacent the second end 40 of the conveyor 36. In exemplary arrangements, the conveyor extension 82 is in operative connection with the frame 14 such that the outward end 86 of the conveyor extension 82 is selectively positionable to be disposed substantially horizontally outward in the second direction 44 away from the hopper 18. Conversely, the inward end 84 of the conveyor extension 82 is disposed horizontally from the outward end 86 in the first direction 42, and is closer to the hopper 18 than the outward end 86.

Figure 28:
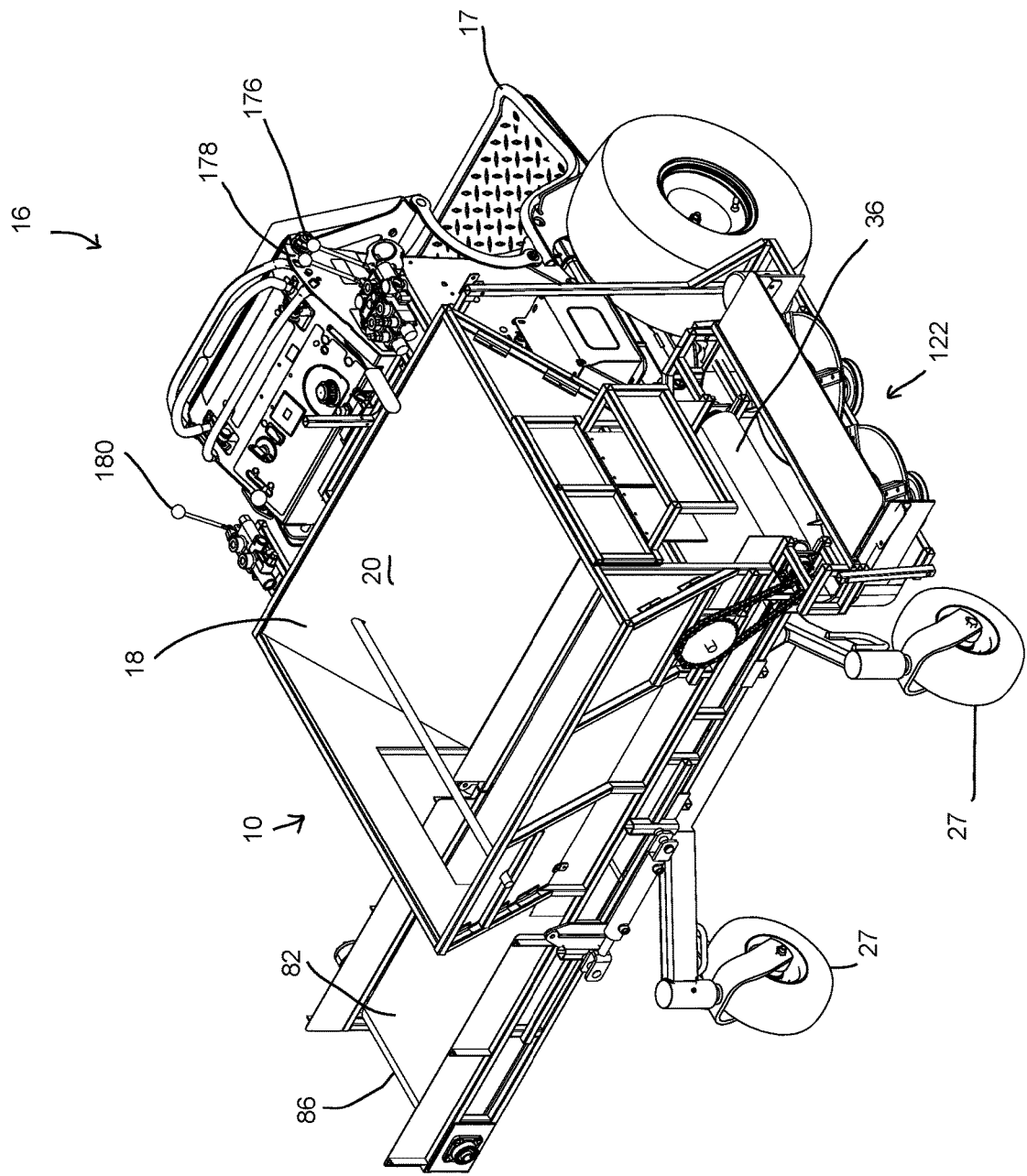
FIG. 28 is a front top right perspective view of the exemplary accessory mounted in operative engagement with an exemplary self-propelled landscaping device.

In exemplary arrangements, bulk material within the interior area 20 of the hopper 18 is discharged through the lower opening 32 onto the upper run 46 of the conveyor 36. Thereafter, when the conveyor extension is in an operational position such as is shown in FIG. 28, bulk material that is on the conveyor 36 and that is selectively moved in the second direction 44 by movement of the conveyor 36, is moved toward the second end 40 of the conveyor 36. Bulk material at the second end 40 of the conveyor 36 falls downward from the conveyor 36 to the inward end 84, or is otherwise transferred from the conveyor 36 to the inward end 84 of the conveyor extension 82. Bulk material received at the inward end 84 of the conveyor extension 82 is enabled to move along the conveyor extension 82 in the second direction 44 from the inward end 82 to the outward end 86. Bulk material that is moved to the outward end 86 of the conveyor extension 82 is enabled to be discharged from the outward end 86 of the conveyor extension 82 and to fall by gravity downward to create a pile of the bulk material. Generally, in exemplary arrangements, bulk material that moves to the outward end 86 of the conveyor extension 82 is discharged therefrom in the second direction 44 and may be pushed by other bulk material that has moved from the conveyor 36 to the inward end 84 and that has moved along the conveyor extension 82 in the second direction 44 toward the outward end 86.

In some exemplary arrangements, the exemplary conveyor extension 82 may include a downward angled trough, a slide, or a chute 90 for transporting or moving the bulk material received at the inward end 84 across an upper surface 92 of the conveyor extension 82 to the outward end 86 for discharging therefrom. The material discharged from the conveyor extension may be accumulated in a pile, or material may be discharged into one or more lines of material as the landscaping device is moving along the path of travel of the device. In some arrangements an exemplary upper surface 92 of the conveyor extension may be generally flat, smooth, and comprised of a suitable material such as steel or aluminum, or alloys thereof, that enables the bulk material thereon to easily move in contacting relation with the upper surface 92 from the inward end 84 to the outward end 86 of the conveyor extension 82 without substantial frictional resistance. In some exemplary arrangements, the upper surface 92 may be coated with a suitable material that facilitates the ease of movement of bulk material across the upper surface 92. In other exemplary arrangements, the conveyor extension 82 may include liquid hoses or lines operatively connected to a liquid tank in operative connection with the accessory 10 for the selective delivery of a liquid flow onto the upper material supporting surface 92. The liquid in some arrangements may be a water based material having properties that facilitate the flow of bulk material across the upper surface 92. In some exemplary arrangements the liquid may also provide a cooling effect to the surface 92 and the bulk material that may become hot due to sunlight, friction, or operational or environmental factors, or alternatively the liquid may be used to reduce dust or to activate properties of the bulk material.

In some exemplary arrangements, the bulk material present on the surface 92 of the conveyor extension chute 90 is caused to move from the inward end 84 to the outward end 86 merely by the pushing force of other bulk material present on chute 90 received from the conveyor 36 and that is moving in the second direction 44. In other exemplary arrangements, the chute 90 may be angled downward from the horizontally extending conveyor 36 such that the chute 90 extends at an obtuse angle relative to the horizontally extending conveyor 36, thereby enabling the bulk material that is received at the inward end 84 to more easily move across the upper surface 92 of the chute 90 toward the outward end 86 and to be more easily discharged from the outward end 86.

Figure 8:
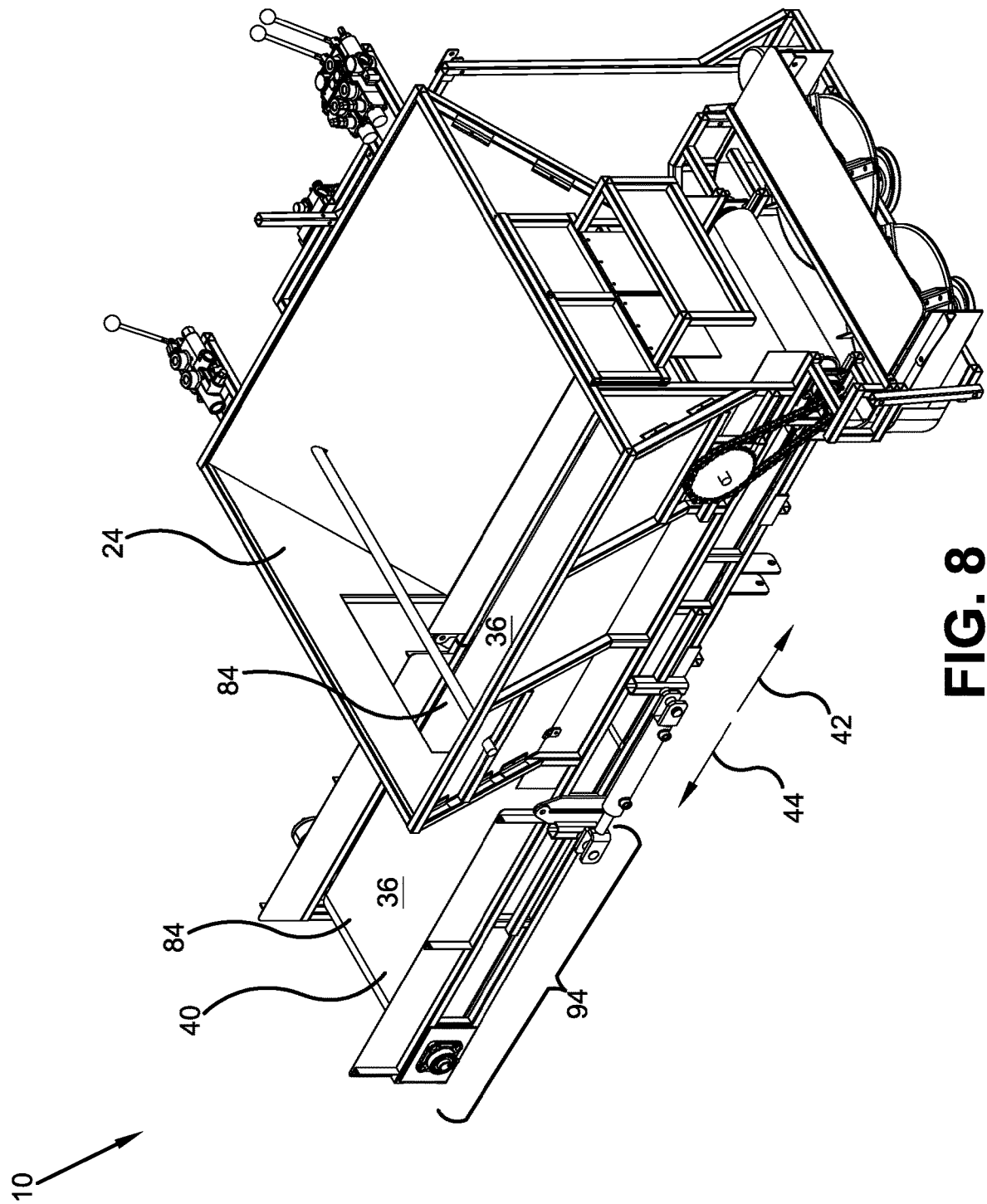
FIG. 8 is a front top right perspective view of the exemplary accessory showing an alternative exemplary conveyor extension.

Now referring to FIG. 8, there is shown therein the exemplary accessory 10 as previously described including an alternative exemplary conveyor extension 94. The exemplary alternative conveyor extension 94 is similar to the conveyor extension 82. However, conveyor extension 94 differs in that it includes a conveyor portion. In some arrangements the conveyor portion may be integral with the at least one conveyor 36. In such exemplary arrangements including the conveyor extension 94, the conveyor 36 extends in the second direction 44 from the lower opening of the hopper 18. Further, in such exemplary arrangements, the second conveyor 36 may extend in the second direction 44 all the way to the outward end 86 of the conveyor extension. In such exemplary arrangements, bulk material discharged from the interior area 20 is moved in the second direction 44 beyond the second end wall 24 and is discharged from the outward end 86 of the exemplary alternative conveyor extension 94.

Figure 9:
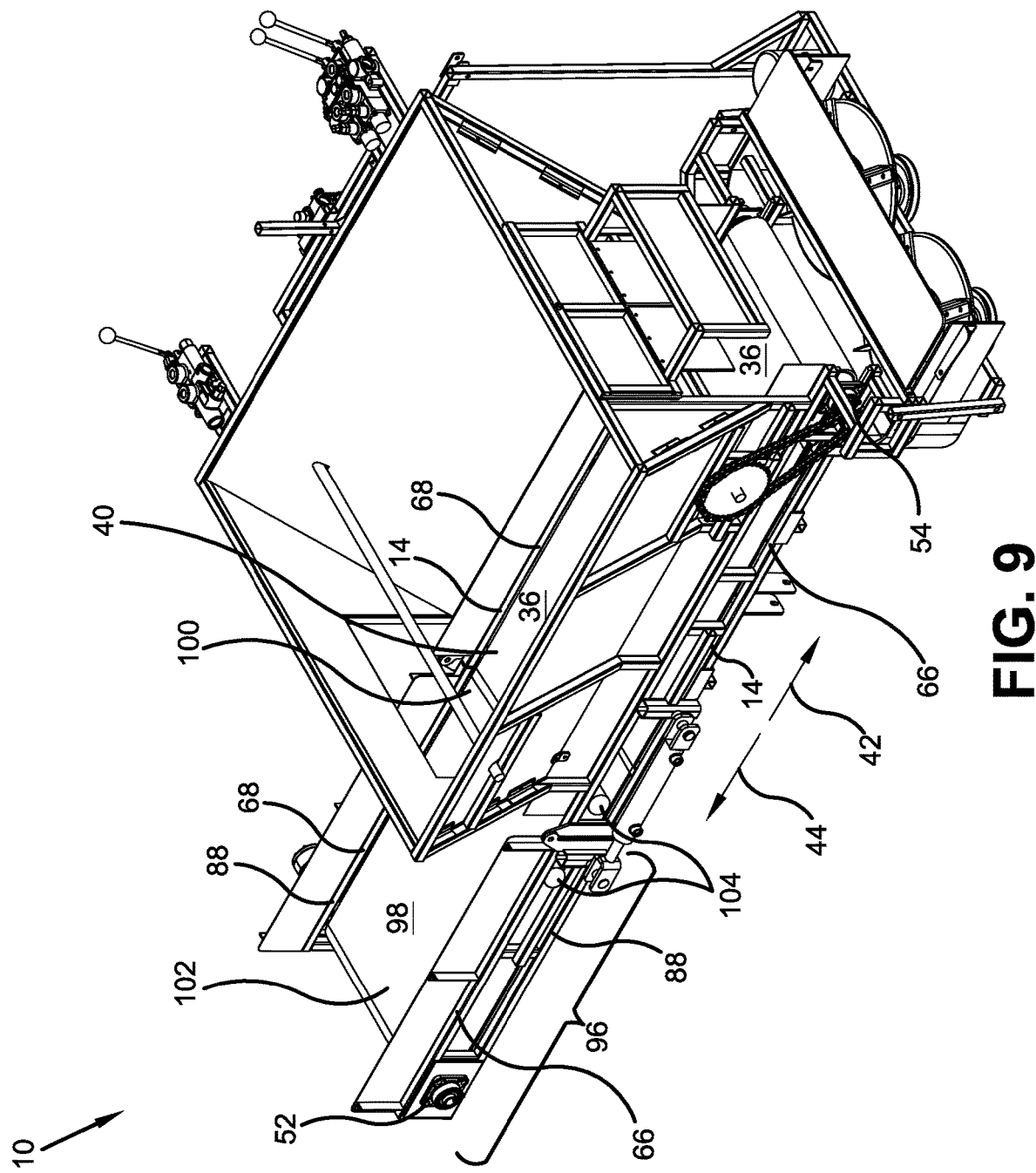
FIG. 9 is a front top right perspective view of the exemplary accessory showing a further alternative exemplary conveyor extension.

Now referring to FIG. 9, there is shown therein the exemplary accessory 10 as previously described and including an alternative conveyor extension 96. The exemplary conveyor extension 96 is similar to conveyor extension 82. However, the exemplary conveyor extension 96 includes a further conveyor portion 98. The exemplary further conveyor 98 may be similar in structure and function to the at least one conveyor 36. In such exemplary arrangements including the conveyor extension 96, the exemplary further conveyor 98 includes a first further conveyor end 100 and a second further conveyor end 102. The first further conveyor end 100 is positioned on the exemplary conveyor extension 96 at the conveyor extension inward end 84, and the second further conveyor end 102 is positioned on the conveyor extension 96 at the conveyor extension outward end 86. In such arrangements including the conveyor extension 96 with the further conveyor 98, additional pulleys 104 may be provided in arrangements in which the further conveyor 98 comprises a belt conveyor similar to belt conveyor 48.

The exemplary additional pulleys 104 extend transversely to the first and second direction 42 and 44 and extend between the front portions 66 of the frames 14 and 88 and the rear portions 68 of the frames 14 and 88. The exemplary additional pulleys 104 are in operative rotatable connection with the frame 14 generally adjacent the second end 40 of the conveyor 36, and in operative rotatable connection with the frame 88 generally adjacent the further conveyor first end 100. The exemplary additional pulleys 104 may be similar in structure and function to the pulleys 52 and 54, and may also be in operative connection with the conveyor motor 74 to cause selective movement of both the conveyors 36 and 98 in either the first direction 42 or in the second direction 44. In some exemplary arrangements including the alternative exemplary conveyor extension 96, with the conveyor extension in the operative position bulk material discharged from the interior area 20 is moved in the second direction 44 toward the second end 40 of the conveyor 36 and is operatively transferred therefrom, and received by the conveyor extension first end 100. The material is then moved on the further conveyor 98 in the second direction 44 toward the further conveyor second end 102 to be discharged therefrom at the outward end 86 of the further conveyor 98. In some exemplary arrangements, the conveyors 36 and 98 may be in partially overlapping relation such that the further conveyor 98 extends below or underneath the conveyor 36, thereby enabling bulk material to fall from the conveyor 36 at the second end 40 onto the further conveyor first end 100. Of course this approach is exemplary and in other arrangements other approaches may be used.

Still further, in some exemplary arrangements of the accessory 10, although not shown, the accessory 10 may not include a conveyor extension, or have the conveyor extension removable therefrom. In such exemplary arrangements, the bulk material that is discharged from the interior area 20 of the hopper 18 through the lower opening 32 moves on the conveyor 36 in the second direction 44 and is discharged from the second end 40 of the conveyor 36. Such arrangements may be useful in areas or zones of an environment or property that have narrow gaps or openings through which the self-propelled landscaping device 16 must be maneuvered in order to spread the bulk material or to discharge the bulk material into piles.

Figure 10:
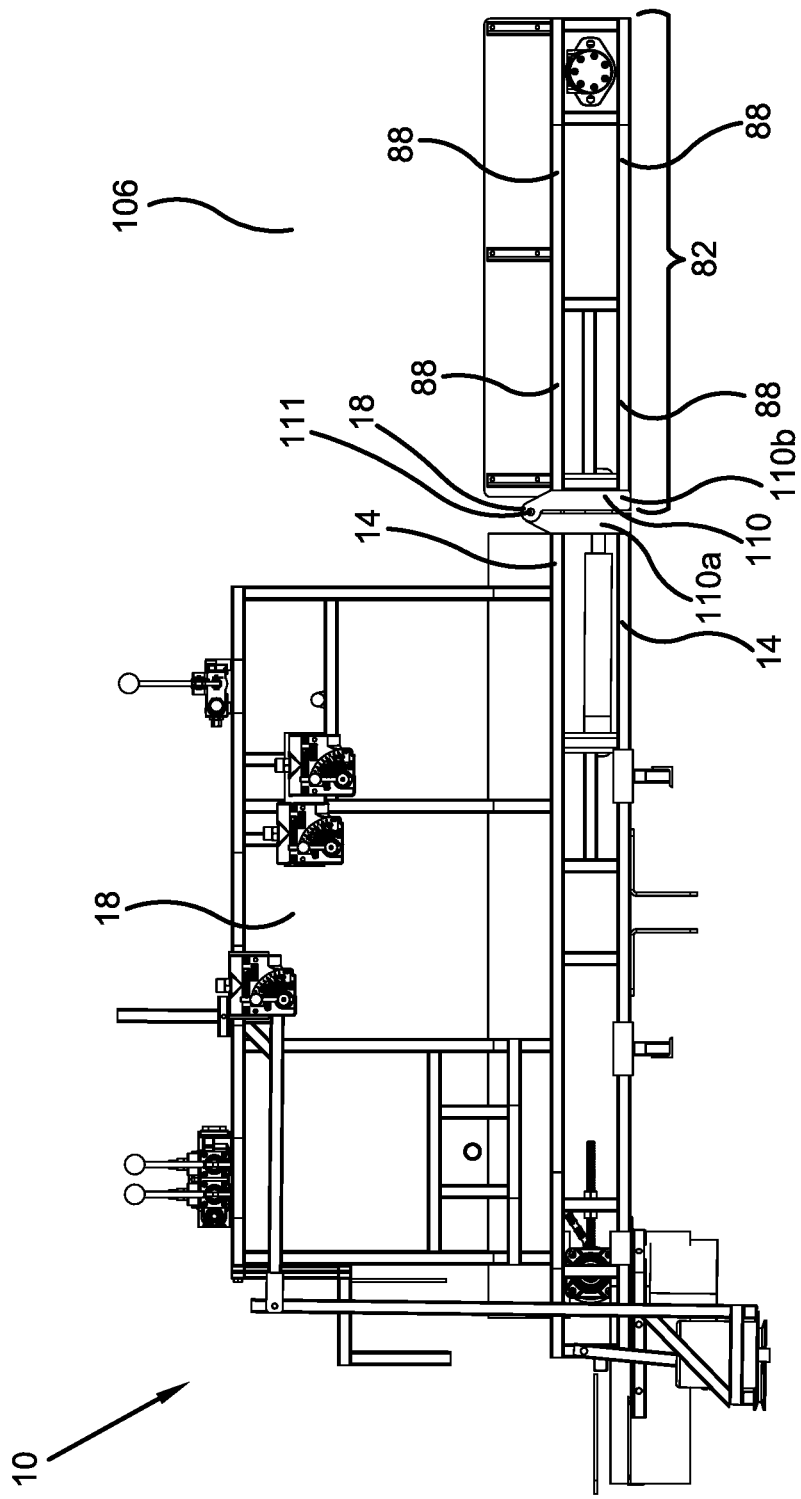
FIG. 10 is a back view of the exemplary accessory showing the exemplary conveyor extension in the downward position.
Figure 11:
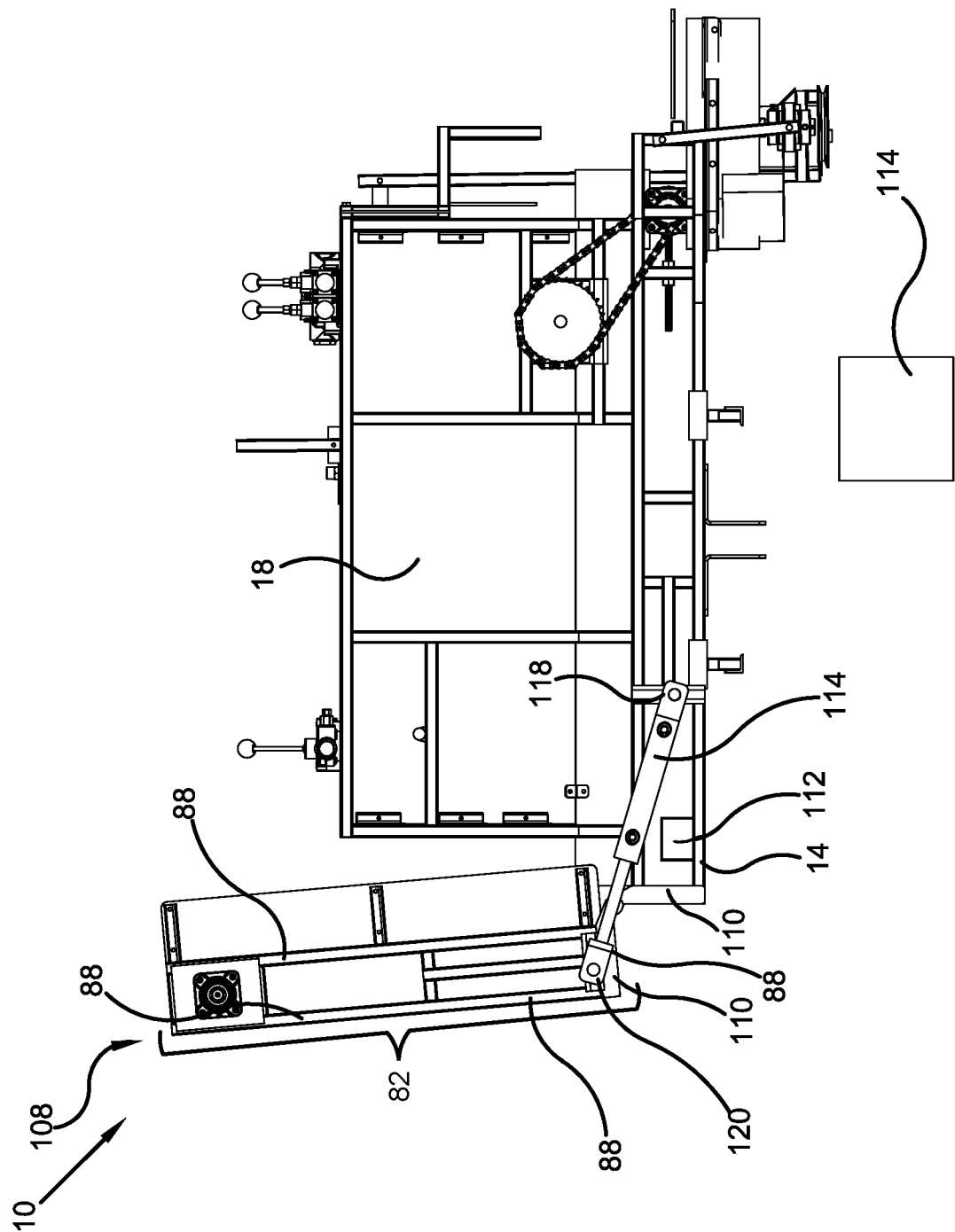
FIG. 11 is a front view of the exemplary accessory showing the exemplary conveyor extension in the upward position.
Figure 12:
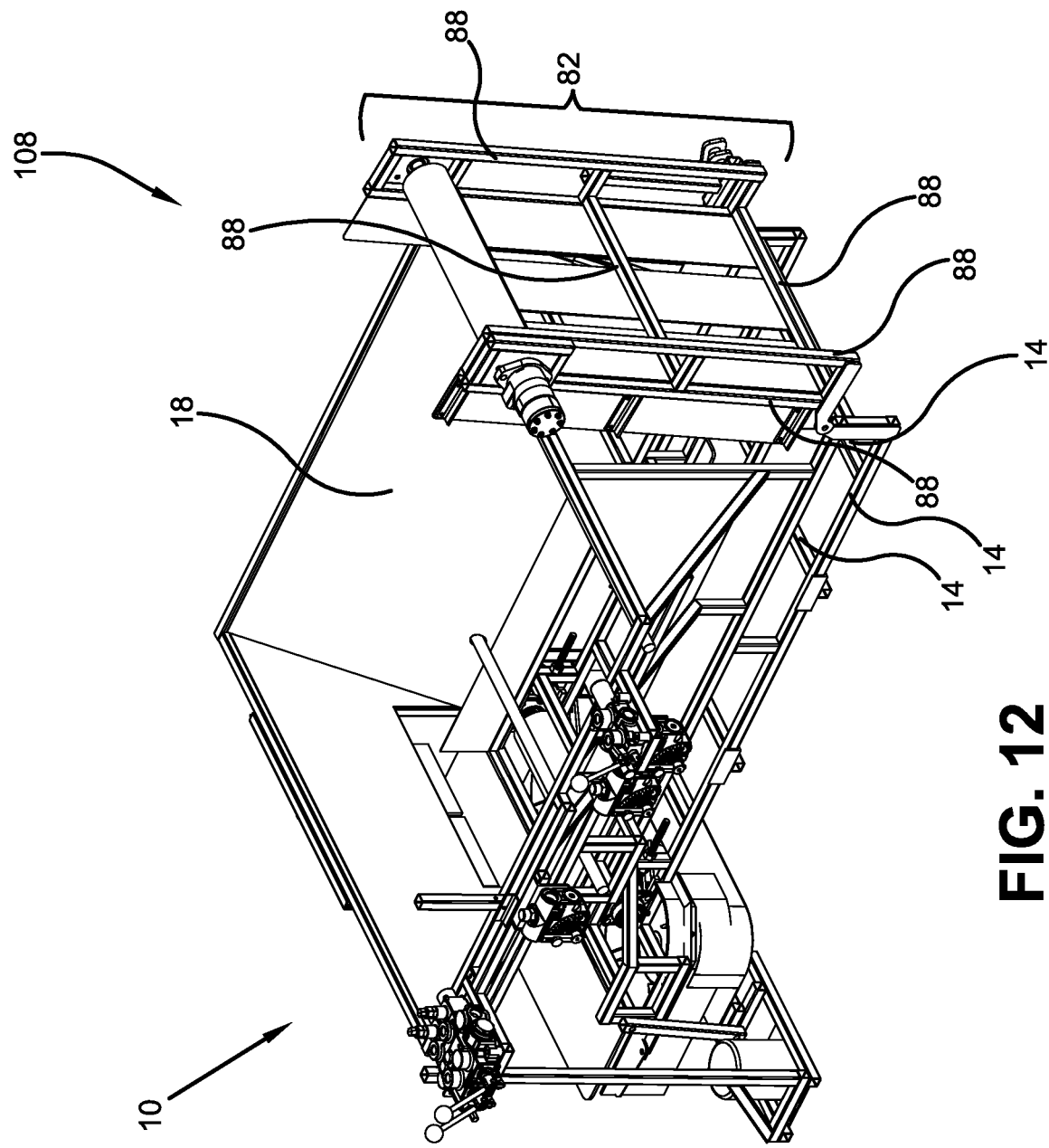
FIG. 12 is a back top right perspective view of the exemplary accessory showing the exemplary conveyor extension in the upward position.
Figure 13:
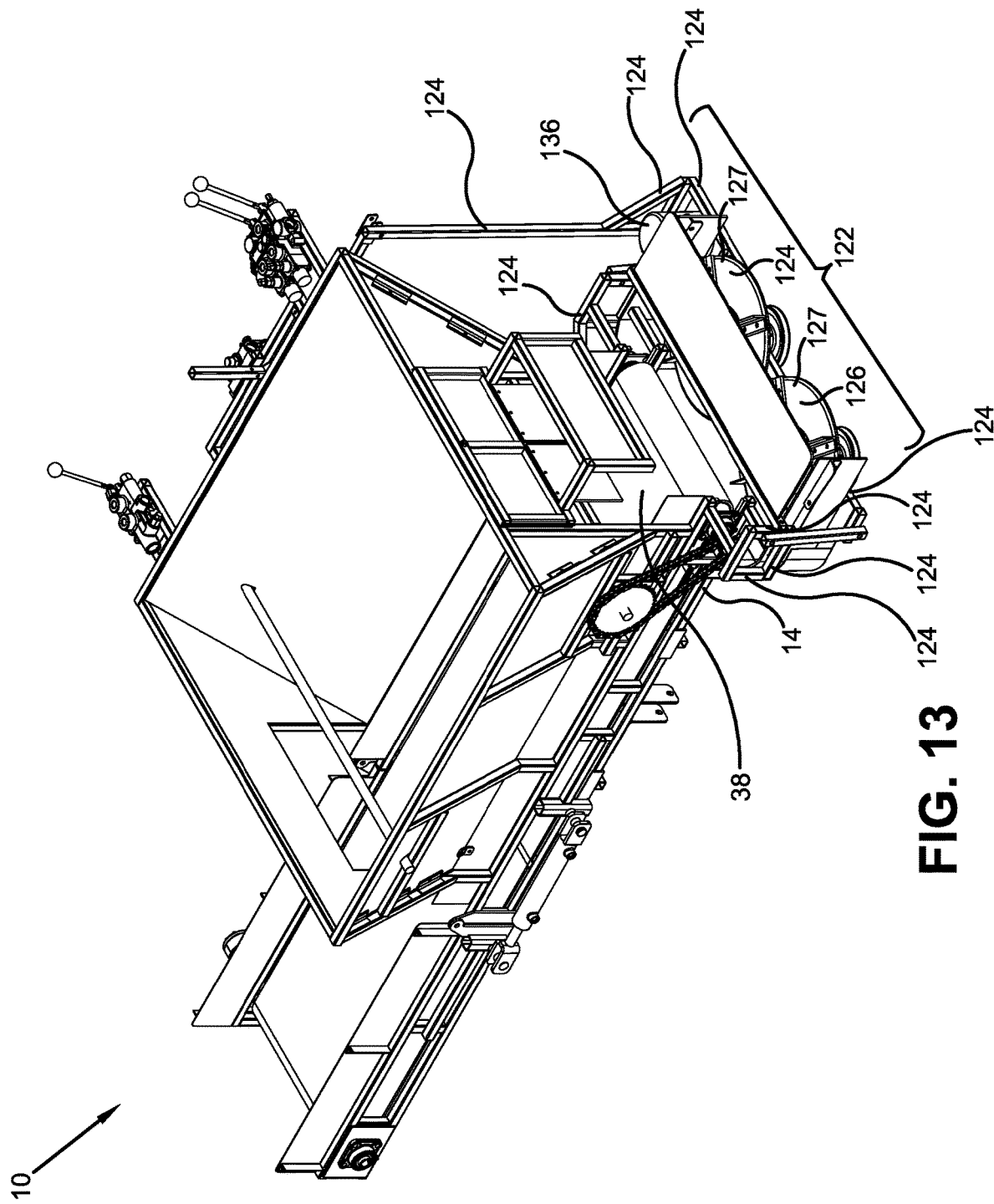
FIG. 13 is a front top right perspective view of the exemplary accessory showing the exemplary spreader and exemplary spreader members.
Figure 14:
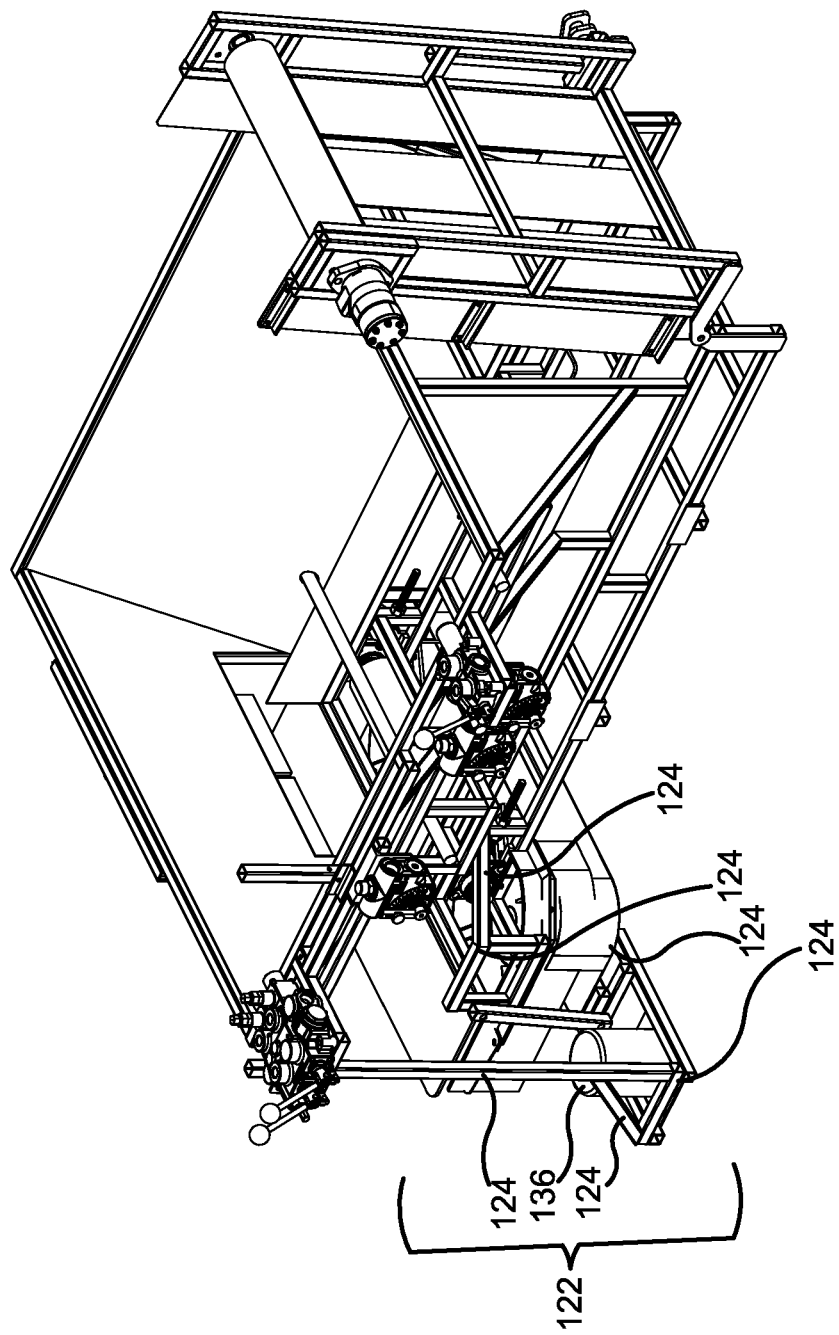
FIG. 14 is a back top right perspective view of the exemplary accessory showing the exemplary spreader frame and exemplary spreader motor.
Figure 15:
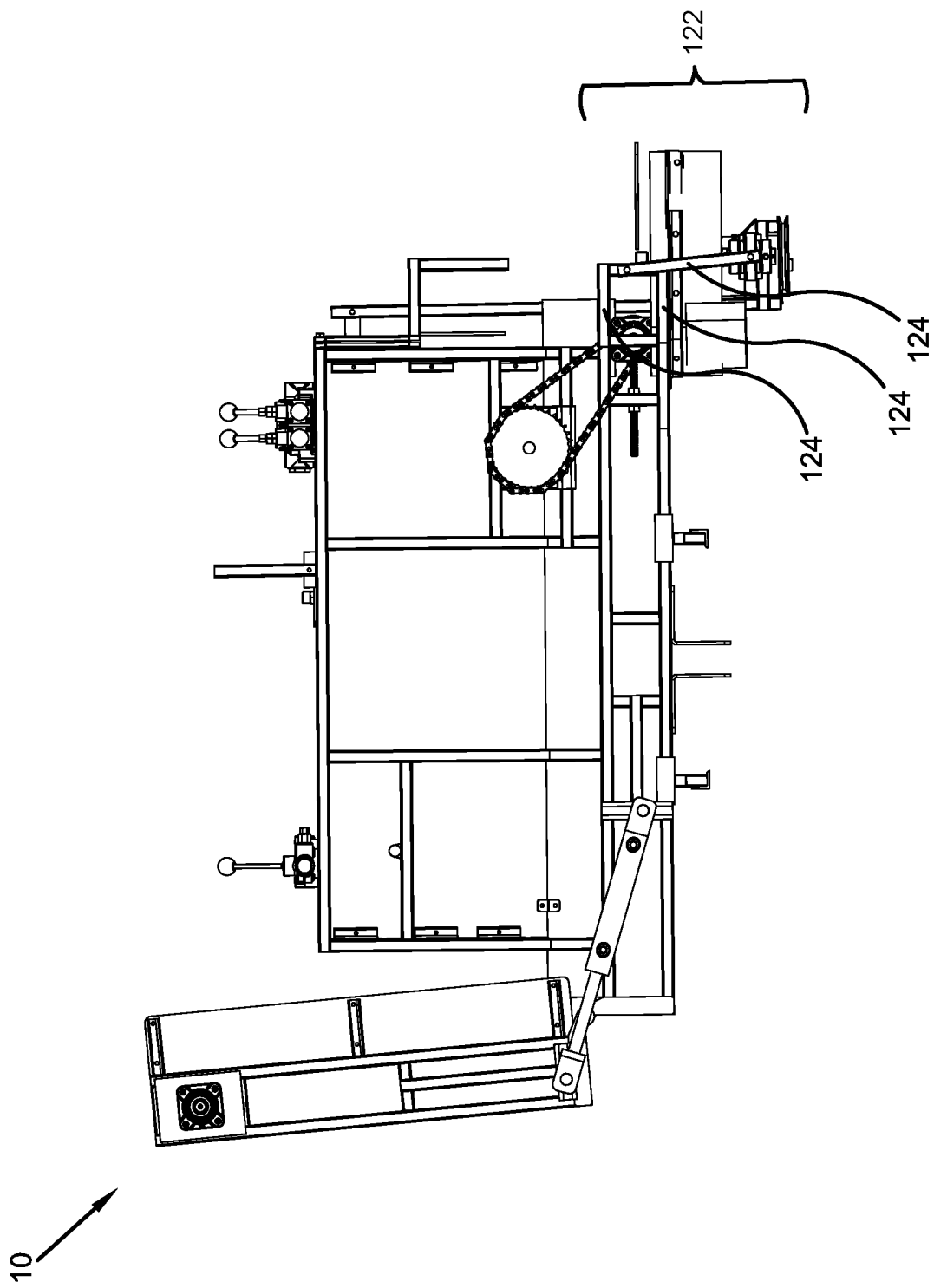
FIG. 15 is a front view of the exemplary accessory showing the exemplary spreader and exemplary spreader frame.
Figure 16:
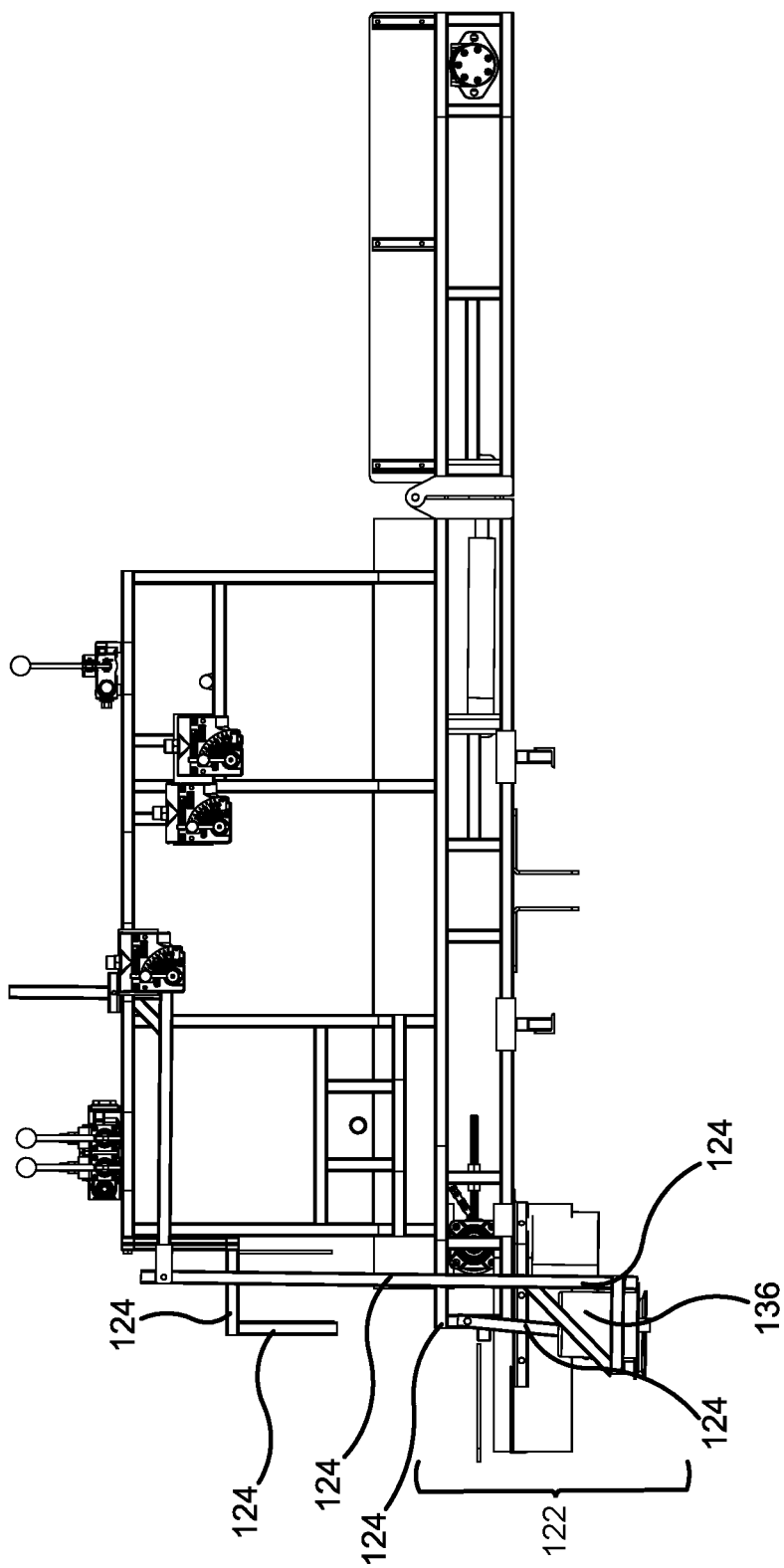
FIG. 16 is a back view of the exemplary accessory showing the exemplary spreader, exemplary spreader motor, and exemplary spreader frame.

Now referring to FIGS. 10-12, there is shown therein an exemplary arrangement of accessory 10 including the conveyor extension 82. However, it should be understood that although the exemplary arrangements of accessory 10 shown in FIGS. 10-12 will be described herein as including the exemplary conveyor extension 82, it should be understood that the exemplary arrangements of accessory 10 shown in FIGS. 10-12 may alternatively include the conveyor extensions 94 or 96, and function in a similar manner as previously described. In exemplary arrangements of accessory 10 shown in FIGS. 10-12, the exemplary conveyor extension 82 is movably mounted in operatively supported connection with the frame 14. In such exemplary arrangements, the conveyor extension frame portion 88 is operatively connected to the remainder of the frame 14 that is in operatively supporting connection with the hopper 18 and the conveyor 36 such that the conveyor extension 82 is movable between a downward operational position 106 shown in FIG. 10, and a non-operational upward position 108 shown in FIGS. 11-12.

FIGS. 10-12 show exemplary arrangements including the movably mounted conveyor extension 82. In such arrangements, the conveyor extension frame portion 88 is operatively connected to the frame 14 through a suitable movable connection means that is operative to permit the conveyor extension 82 to move relative to the remainder of the frame 14 between the downward position 106 and the upward position 108. In exemplary arrangements, the conveyor extension frame portion 88 is operatively movably connected to the frame 14 by a hinge 110. The exemplary hinge 110 includes a first hinge piece 110a and a second hinge piece 110b that are operatively rotatable about a hinge pin 111. The first hinge piece 110a is in operative fixed connection with the frame 14 and the second hinge piece 110b is in operative fixed connection with the frame 88. As such, the exemplary conveyor extension 82 is enabled to move relative to the frame 14, the hopper 18, and the conveyor 36 because the conveyor extension frame portion 88 is permitted to pivot about the hinge 110. As a result the conveyor extension 82 is selectively movable between the downward operational position 106 in which the outward end extends substantially horizontal from the inward end, and the upward non-operational position 108 in which the outward end is disposed vertically above the inward end. However, it should be understood that this hinge connection of the conveyor extension frame portion 88 to the frame 14 is merely exemplary, and in other arrangements, other connection means that permit movement of the conveyor extension 82 relative to the frame 14, the hopper 18, and the conveyor 36 may be used to selectively position the outward end of the conveyor extension. For example, in other arrangements, the hinge 110 may alternatively be an axel and shaft arrangement, a rotatable clevis arrangement, or a pin and aperture arrangement. Such arrangements may provide selective positioning of the outward end vertically and/or horizontally. Still further, in some exemplary arrangements the connection means used may enable the frame 14 and the frame 88 to be easily separated when desired such that the conveyor extension 82 is detachable from the frame 14.

In alternative exemplary arrangements of the accessory 10, the exemplary conveyor extension 82, 96 may be in operatively slidable connection with the frame 14 such that the conveyor extension 82, 96 is slidably movable between an inward position and an outward position. In the inward position of the conveyor extension 82, 96, the upper surface 92 of the conveyor extension 82, or the further conveyor 98 of the conveyor extension 96, is positioned relative to the frame 14 such that in this retracted position, bulk material moving in the second direction 44 on the conveyor 36 is not enabled to be received onto the conveyor extension 82, 96. When moved to an outward extended position of the conveyor extension 82, 96, bulk material that is moved in the second direction 44 on the conveyor 36 is enabled to be received by falling onto the conveyor extension 82, 96 and be moved along the conveyor extension 82, 96 and discharged from the outward end 86 of the conveyor extension 82, or from the second further conveyor end 102 of the conveyor extension 98.

In such exemplary arrangements, the conveyor extension frame portion 88 may be operatively slidable beneath the conveyor that extends immediately below the hopper opening. In some exemplary arrangements, the conveyor extension frame portion 88 may be configured such that it has a greater width from the front 66 to the back 68 than the front to back width of the frame 14, thereby enabling the conveyor extension 82 to be slidably moved relative to the frame 14 on the outside of the frame 14 between the inward and outward positions of the conveyor extensions. Of course, in some arrangements the frame 88 may also have a narrower width from front to back than the width of the frame 14. Numerous different arrangements may be implemented to accomplish such functions.

In exemplary arrangements in which the conveyor extension 82, 96 is slidably movable relative to the frame 14, the frame 14 and the frame 88 may include in operatively attached fixed connection therewith, a guided wheel and rail system that enables the conveyor extension 82, 96 to slidably move relative to the frame 14. Such exemplary guided wheel and rail systems may also include suitable structures and components for raising and lowering the conveyor extension 82, 96 and the frame 88 thereof relative to the frame 14.

As shown in FIG. 11, in exemplary arrangements including the movably mounted conveyor 82, 94, and 96, the accessory 10 may further include a conveyor extension motor 112. The exemplary conveyor extension motor 112 is in operative connection with the conveyor extension frame portion 88 such that the motor 112 is operative to cause movement of the conveyor extension 82, 94, and 96 between the downward position 106 and the upward position 108. Still further, in the exemplary arrangements in which the conveyor extension 82, 96 is slidably movable relative to the frame 14, the motor 112 may also be in operative connection with the conveyor extension frame 88 to cause such sliding movement between the inward and outward positions of the conveyor extension 82, 96. The exemplary motor 112 is selectively operable to cause movement of conveyor extension 82, 96 between the downward position, the upward position, the inward position, or the outward position.

In the exemplary arrangement shown in FIG. 11, the exemplary motor 112 comprises a hydraulic motor and is hydraulically driven through fluid connection with a hydraulic pump 114. The hydraulic pump of the exemplary arrangement is in operative connection with an engine (which is alternatively referred to herein as a drive or motor) of the self-propelled landscaping device 16. In such exemplary arrangements, the hydraulic pump 114 is in operative connection with a hydraulic cylinder 116. The exemplary hydraulic cylinder includes a first hydraulic cylinder end 118 and a second hydraulic cylinder end 120. The first hydraulic cylinder end 118 is in operative connection with either the frame 14 or the frame 88, and the second hydraulic cylinder end 120 is in operative connection with the other of the frame 14 and the frame 88. The exemplary hydraulic cylinder 116 is suitably configured with a stroke length that is sufficient to cause the exemplary conveyor extension 82 to move between the downward operational position 106 and the upward non-operational position 108. However, it should be understood that this arrangement for causing movement of the conveyor extension 82 is merely exemplary, and in other arrangements, other means for causing movement of the conveyor extension 82 may be used. For example, the conveyor extension 82 may be moved between the downward position 106 and the upward position 108 by manual movement, a pneumatic drive system, an electrical drive system, or any other means of causing manual or automated movement of the exemplary conveyor extension 82.

Now referring to FIGS. 13-18, there is shown therein an exemplary accessory 10 as previously described further including an exemplary spreader 122. The exemplary spreader 122 includes a spreader frame 124. The exemplary spreader frame 124 is operative to support the various structures and components of the spreader 122. The exemplary spreader frame 124 is in operatively fixed, or in some instances operatively releasable connection with the frame 14. The exemplary spreader frame 124 is comprised of a material similar to that of the frame 14. In alternative exemplary arrangements, the various structures and components of the spreader 122 are in operatively supported connection with portions of the frame 14, as opposed to a separate spreader frame.

As shown in FIGS. 13-18, the exemplary spreader 122 includes at least one rotatable spreader member 126. The exemplary spreader member 126 may comprise a rotating disc suitable for moving and propelling the bulk material being handled by the accessory. The exemplary spreader member 126 may comprise a suitable rotating or oscillating structure that is operative to propel bulk material that engages the spreader member 126 in an outward direction away from the accessory 10. In alternative exemplary arrangements, the spreader member 126 may comprise a jet or stream of liquid or air that is operative to propel the bulk material that is engaged with the jet or stream of air or liquid in an outward direction away from the accessory 10.

In exemplary arrangements as shown in FIGS. 13-18, the exemplary spreader member 126 comprises a pair of generally planar rotating spreader discs 127. Each of the rotating spreader discs 127 is operatively rotatable about a respective shaft or axis rod 128, most clearly shown in FIGS. 17-18. Each axis rod 128 is in operative connection with the spreader frame 124 at a position below the generally horizontally extending conveyor 36. The axis rod 128 extends generally vertically upward relative to the frame 124, and perpendicular to the horizontally extending conveyor 36. The respective spreader disc 127 is in operatively fixed rotatable connection with the axis rod 128. In the operative position of the spreader 122, the spreader discs 127 extend horizontally below the horizontally extending conveyor 36 adjacent the first end 38.

Figure 18:
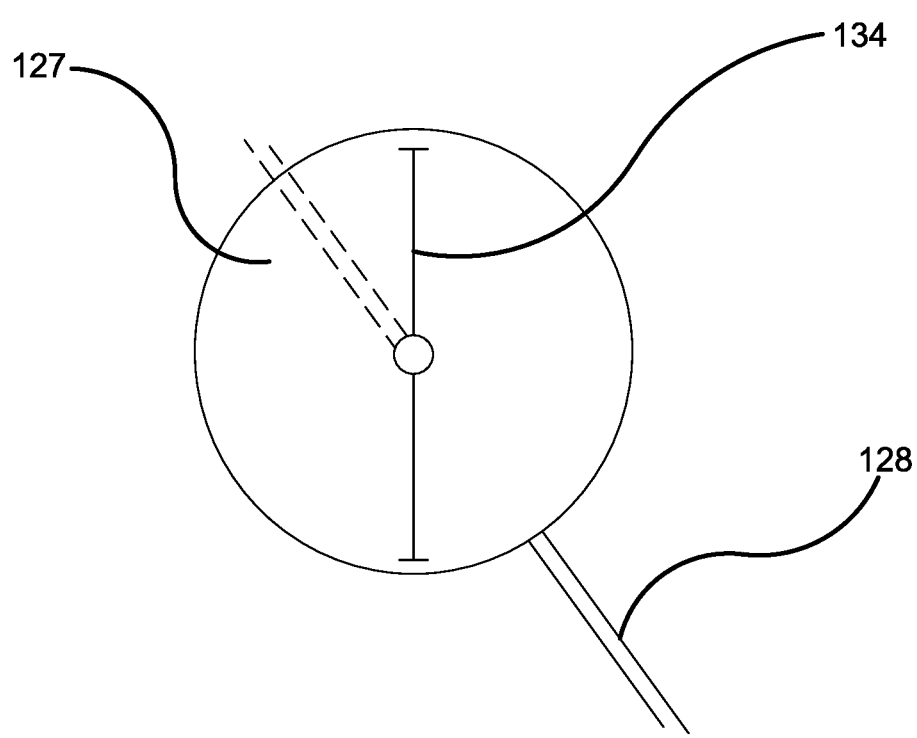
FIG. 18 is a partial perspective view of an exemplary spreader disc and shaft.

The exemplary spreader discs 127 have a diameter indicated 134, most clearly shown in FIG. 18. In exemplary arrangements, at least part of the diameter 134 extends underneath the conveyor 36 at the first conveyor end 38. Further, each of the rotating spreader discs 127 includes at least one projection 130 that extends radially and vertically upward relative to an upper surface 132 of the generally planar rotating spreader discs 127. In exemplary arrangements a suitable shroud is provided adjacent to the spreader discs to cause material that falls onto and is propelled by the spreader discs to be directed in a particular direction away from the body of the accessory.

In exemplary arrangements of the accessory 10, the spreader 122 includes a spreader motor 136 in operative supported connection with either of the spreader frame 124, or the frame 14. The spreader motor 136 is in operative connection with the spreader member 126 such as the spreader discs and is selectively operative to cause rotation of the spreader member 126 at selectively variable rotational speeds or velocities. Selective operation of the spreader motor 136 at variable speeds enables the distance of bulk material spread by the spreader 122 to be changed. For example, in exemplary arrangements at higher rotational speeds of the spreader member 126, the bulk material is enabled to be spread and propelled greater distances away from the accessory 10. Conversely, at lower rotational speeds of the spreader member 126, the bulk material is spread shorter distances away from the accessory 10. This arrangement enables the operator of the self-propelled landscaping device 16 including the exemplary accessory 10 to selectively spread the bulk material across a distance away from the spreader discs as desired.

Similar to the conveyor extension motor 112, the exemplary spreader motor 136 may be in operative connection with the drive or engine of the self-propelled landscaping device 16. In some exemplary arrangements, the exemplary spreader motor 136 may include a hydraulic motor that is in operative fluid connection with the hydraulic pump 114 that is in operative connection with the engine of the self-propelled landscaping device 16.

Figure 17:
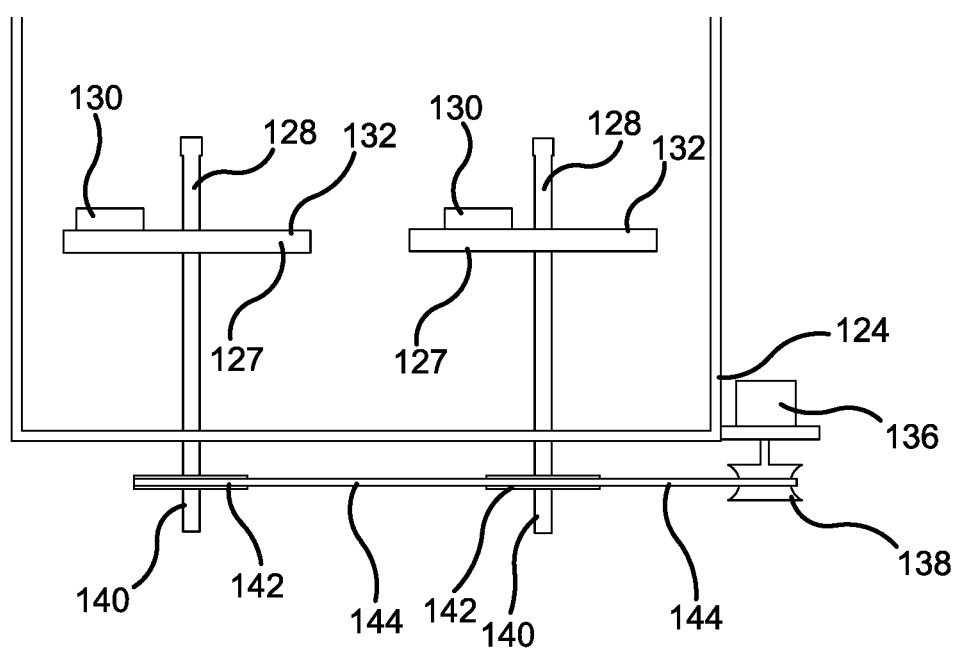
FIG. 17 is a cross-sectional view of the exemplary spreader and the exemplary spreader discs.

In exemplary arrangements as shown in FIGS. 17-18, the spreader motor 136 is in operative connection with a rotating drum 138. The exemplary shafts 128 have a lower portion 140 that extends below the spreader discs 127. The lower portions 140 each have a shaft drum 142 extending in surrounding relation thereof. The shaft drums 142 and the lower portions 140 are in fixed rotatable connection with the shafts 128. In exemplary arrangements, an exemplary drive band 144 extends in close-fitting, taut, surrounding relation of the rotating drum 138 and the shaft drums 142. The drive band 144 is comprised of a durable, generally flexible material such as rubber or polymers, or in some arrangements a flexible metal chain material. In exemplary arrangements, the spreader motor 136 is operative to cause rotation of the spreader drum 138. Responsive to rotation of the spreader drum 138, the drive band 144 is operative to cause rotation of the shaft drums 142 by close-fitting, contacting engagement therewith. Rotation of the shaft drums 142 causes the lower portions 140 and the shaft 128, as well as the spreader discs 127 to rotate at the selected speed corresponding to the speed at which the spreader motor 136 is operated. However, it should be understood that this drive arrangement of the spreader member 126 is merely exemplary, and in other arrangements, other drive means for causing rotation of components the spreader member 126 may be used. For example, the spreader members 126 may be operatively driven through operative connection with the drive output or engine of the self-propelled landscaping device 16, or the spreader members 126 may be driven by an electrical drive system, a pneumatic drive system, or any other means for causing automated selected movement of the spreader members and components thereof.

In exemplary arrangements of the accessory 10, bulk material within the interior area 20 of the hopper 18 that is discharged through the lower opening 32 onto the upper run 46 of the conveyor 36 is caused to selectively move in the first direction 42 by movement of the conveyor 36 in the first direction 42. Bulk material that is moved in the first direction reaches the first end 38 of the conveyor and is discharged therefrom. Bulk material that has been discharged from the first end 38 of the conveyor 36 falls into engagement the spreader member 126 of the spreader 122, and is propelled by the rotation of the spreader discs outward generally in the first direction 42 away from the accessory 10 responsive to rotation of the spreader member 126.

Figure 19:
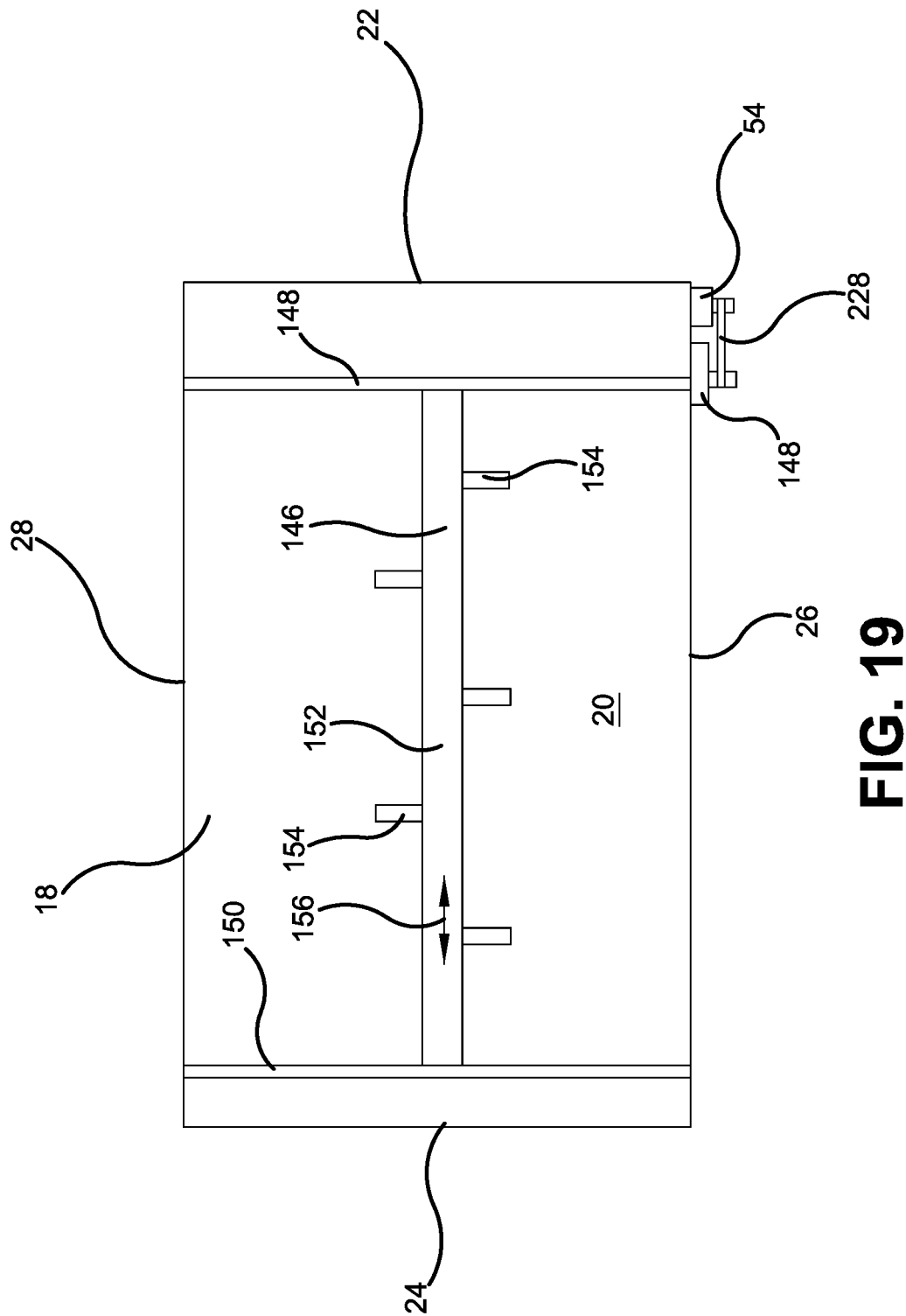
FIG. 19 is a top view of the exemplary hopper and the exemplary movable mixer member.
Figure 20:
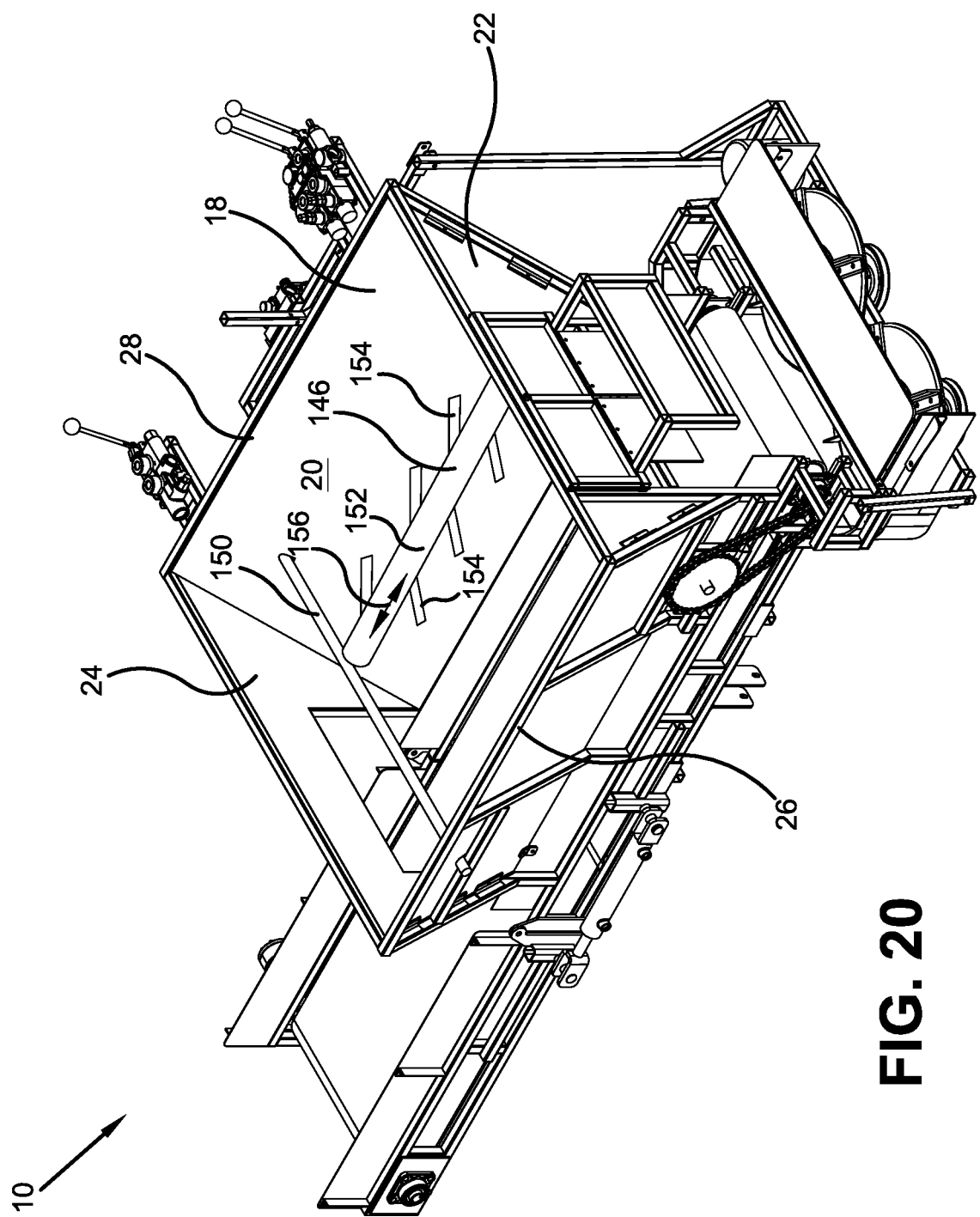
FIG. 20 is a top right perspective view of the exemplary accessory showing the exemplary hopper and exemplary movable mixer member.

Now referring to FIGS. 19-20, there is shown therein an exemplary accessory 10 as previously described, and further including a movable mixer member 146. In exemplary arrangements, the movable mixer member 146 is in operatively supported movable connection with at least one of the end walls 22 or 24, or front or rear walls 26 or 28 of the hopper 18. The exemplary mixer member 146 extends within the interior area 20 of the hopper 18. The exemplary mixer member 146 is movable within the interior area 20 and is operative to cause bulk material within the interior area 20 of the hopper 18 to be mixed and to move responsive to movement of the mixer member 146. The exemplary mixer member 146 is operative to prevent bridging, sticking, clumping, or other states of the bulk material that would prevent or impede the flow of the bulk material from within the interior area 20 through the lower opening 32 of the hopper 18.

In exemplary arrangements, the exemplary mixer member 146 is comprised of a first rotatable crossbar 148 and a second rotatable crossbar 150. The exemplary crossbars 148 and 150 extend between opposing walls of the hopper 18, and in exemplary arrangements, extend between front and rear walls 26 and 28 of the hopper 18. In exemplary arrangements, one of the crossbars 148 and 150 is positioned adjacent the end wall 22 and the other crossbar is positioned adjacent the end wall 24. The crossbars 148 and 150 are in operatively supported rotatable connection with the opposing walls of the hopper 18 through bearing blocks or similar structures. The exemplary mixer member 146 further comprises a movable mixing piece 152. The exemplary movable mixing piece 152 generally extends within a middle of the interior area 20 of the hopper 18 and extends lengthwise between the crossbars 148, 150 adjacent end wall 22 and the end wall 24. The exemplary movable mixing piece 152 is in operatively supported movable connection with the crossbars 148 and 150. The movable mixing piece 152 is movable within the interior area 20 of the hopper 18 responsive to rotation of the crossbars 148 and 150.

In exemplary arrangements of the movable mixing member 152 as shown in FIGS. 19 and 20, the exemplary mixing member 152 comprises an elongated structure of rigid, strong material that is suitable to be movable within a volume of bulk material in the interior area 20 without substantial wear-and-tear or degradation. In exemplary arrangements, the mixing member 152 includes mixing projections 154 that extend generally perpendicularly or transversely to the path or direction of travel of the mixing member 152 indicated at directional arrow 156. In other exemplary arrangements, the mixing projections 154 may extend at acute or obtuse angles relative to the path of travel 156 of the mixing member 152.

In exemplary arrangements, at least one of the crossbars 148 and 150 is rotatable with rotation of the pulleys 52 and 54, of the belt conveyor 48. In such arrangements, the one of the crossbars 148 and 150 is in operative connection with the one of the pulleys 52 and 54. The exemplary one of the crossbars 148 and 150 is operatively connected to the pulley 52, 54 by a mixer drive band 228. In such exemplary arrangements, the mixer drive band 228 may be a suitable belt or dive chain similar to the band 144, and is in close fitting, contacting, partially surrounding, taut engagement with at least a portion of the crossbar 148, 150 and at least a portion of the pulley 52, 54. In such arrangements, the portions of the crossbar 148, 150 and the pulley 52, 54 extends outside of the hopper 18 through the hopper front or rear walls 26, 28. The exemplary movable mixer member 146 is operative to move along the path of travel 156 responsive to rotation of the crossbar 148, 150 that is operatively connected with the rotating pulley 52, 54 via the mixer drive band 228. As such, the exemplary movable mixer member 146 is caused to move responsive to rotation of the crossbar 148, 150 and movement of the band 228 caused by the rotating pulley 52, 54.

However, as can be appreciated, this means of driving or causing movement of the movable mixer member 146 is merely exemplary, and in other arrangements, other means for causing movement of the movable mixer member or rotation movement of the crossbars, may be used. For example, one of the crossbars 148, 150, or a portion of the movable mixer member 146 may be in operative connection with the engine of the self-propelled landscaping device 16. Alternatively one of motors 74, 112, or 136, or an additional motor may be in operative connection with the accessory 10, and such motor connection is operative to cause rotation of the crossbar 148, 150, and/or movement of the movable mixer member 146.

Figure 21:
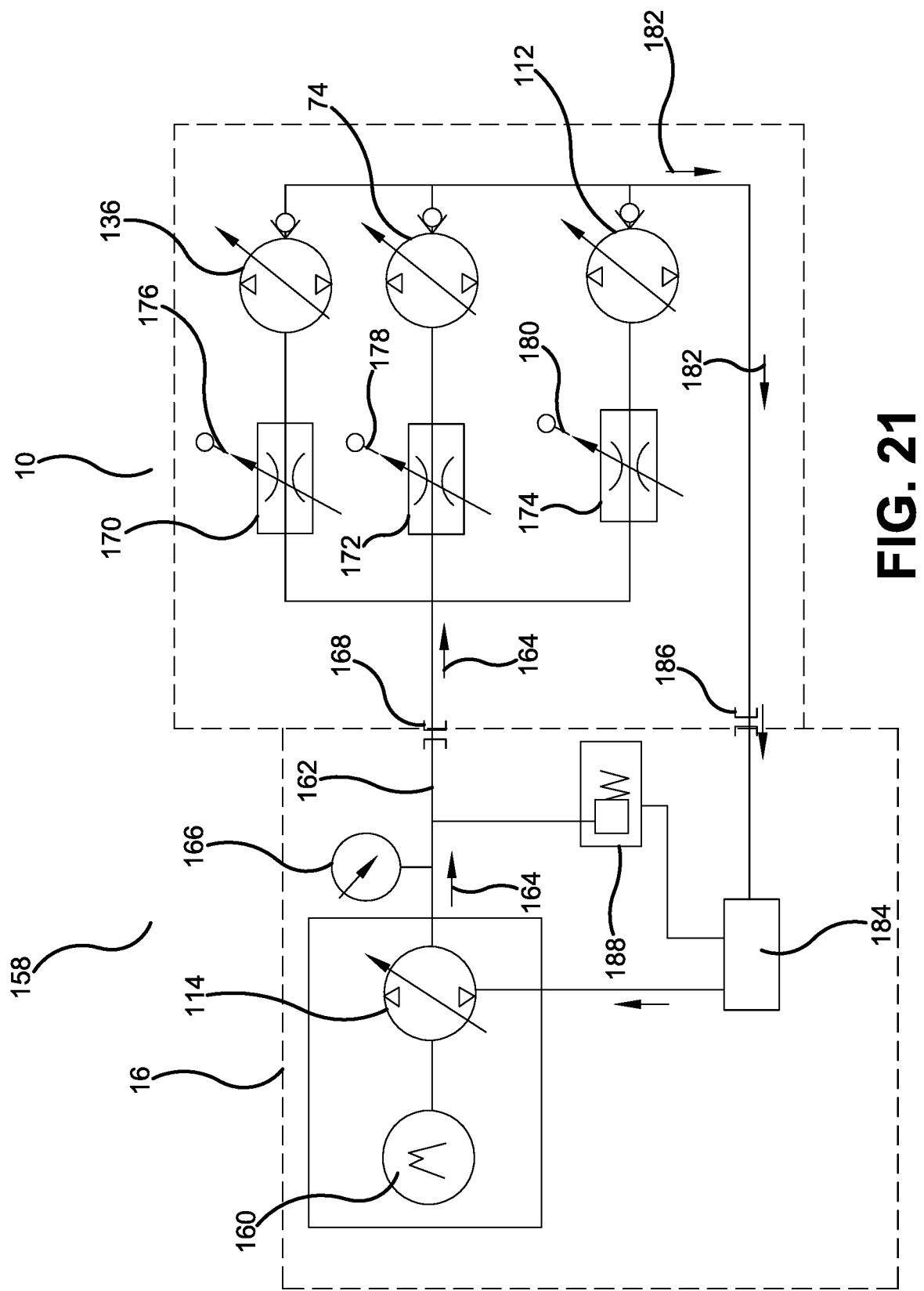
FIG. 21 is a schematic view of an exemplary hydraulic system.
Figure 22:
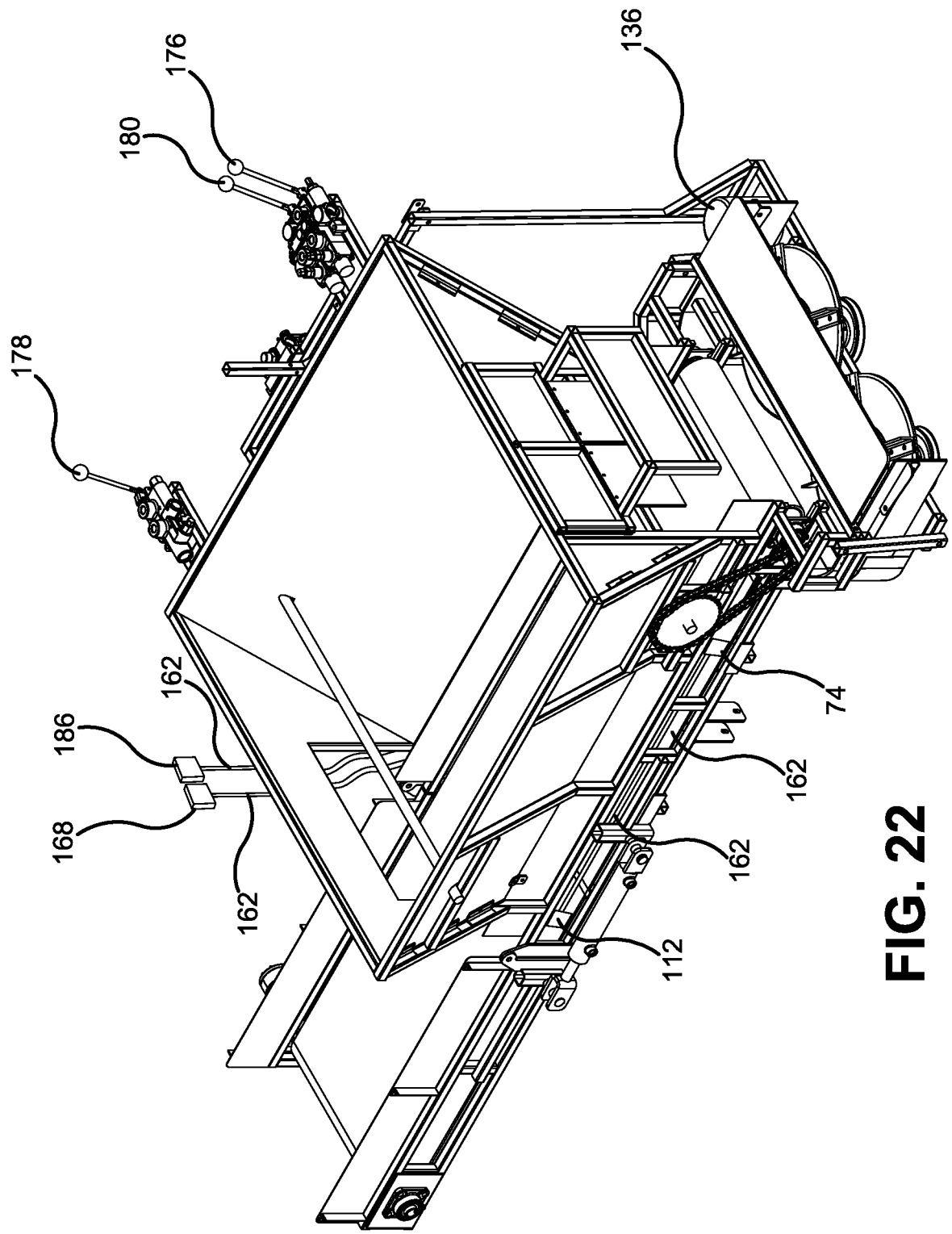
FIG. 22 is a top right perspective view of the exemplary accessory showing components the exemplary hydraulic system.
Figure 23:
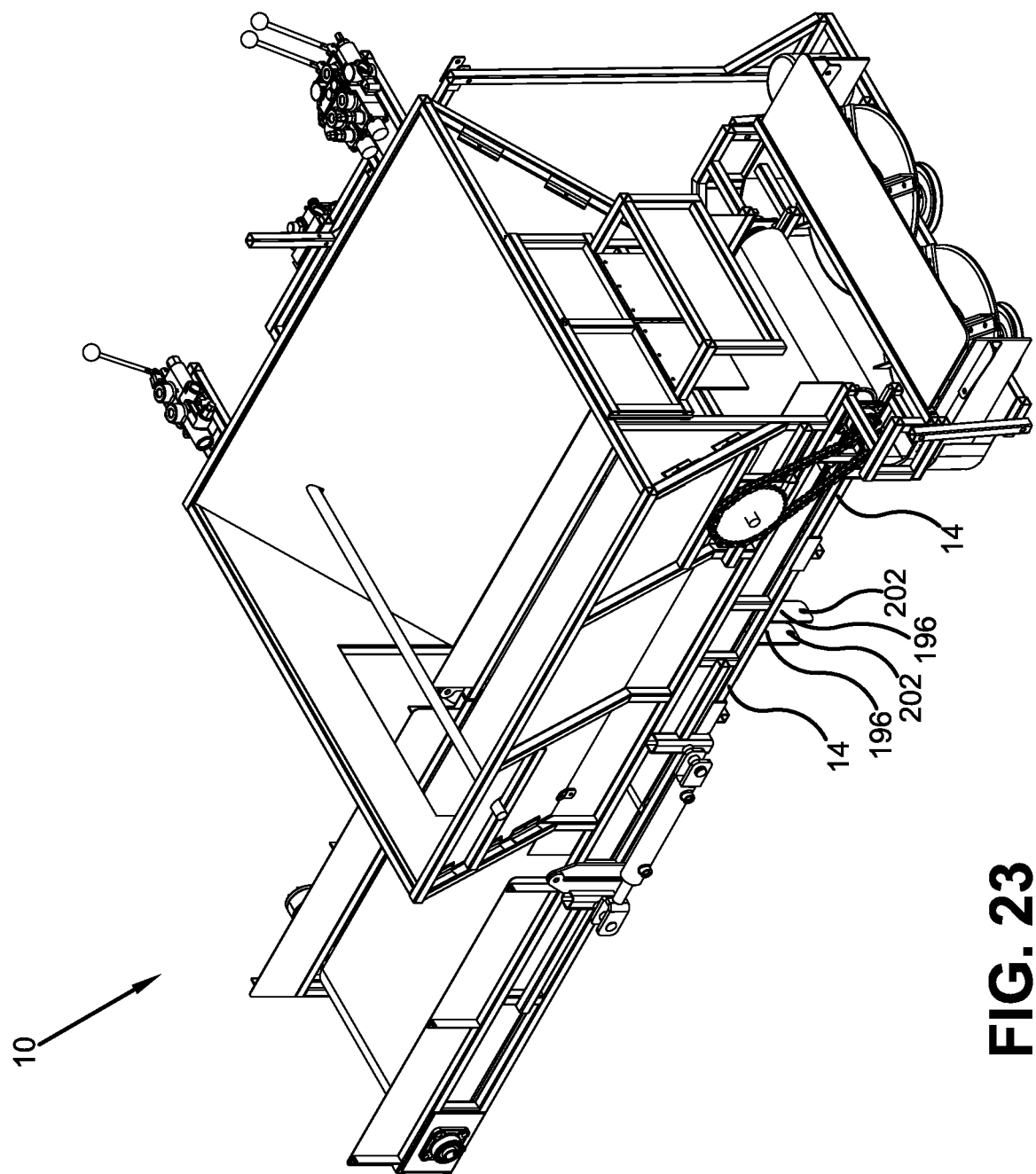
FIG. 23 is a top right perspective view of the exemplary accessory showing an exemplary means of connecting the accessory to the self-propelled landscaping device.
Figure 24:
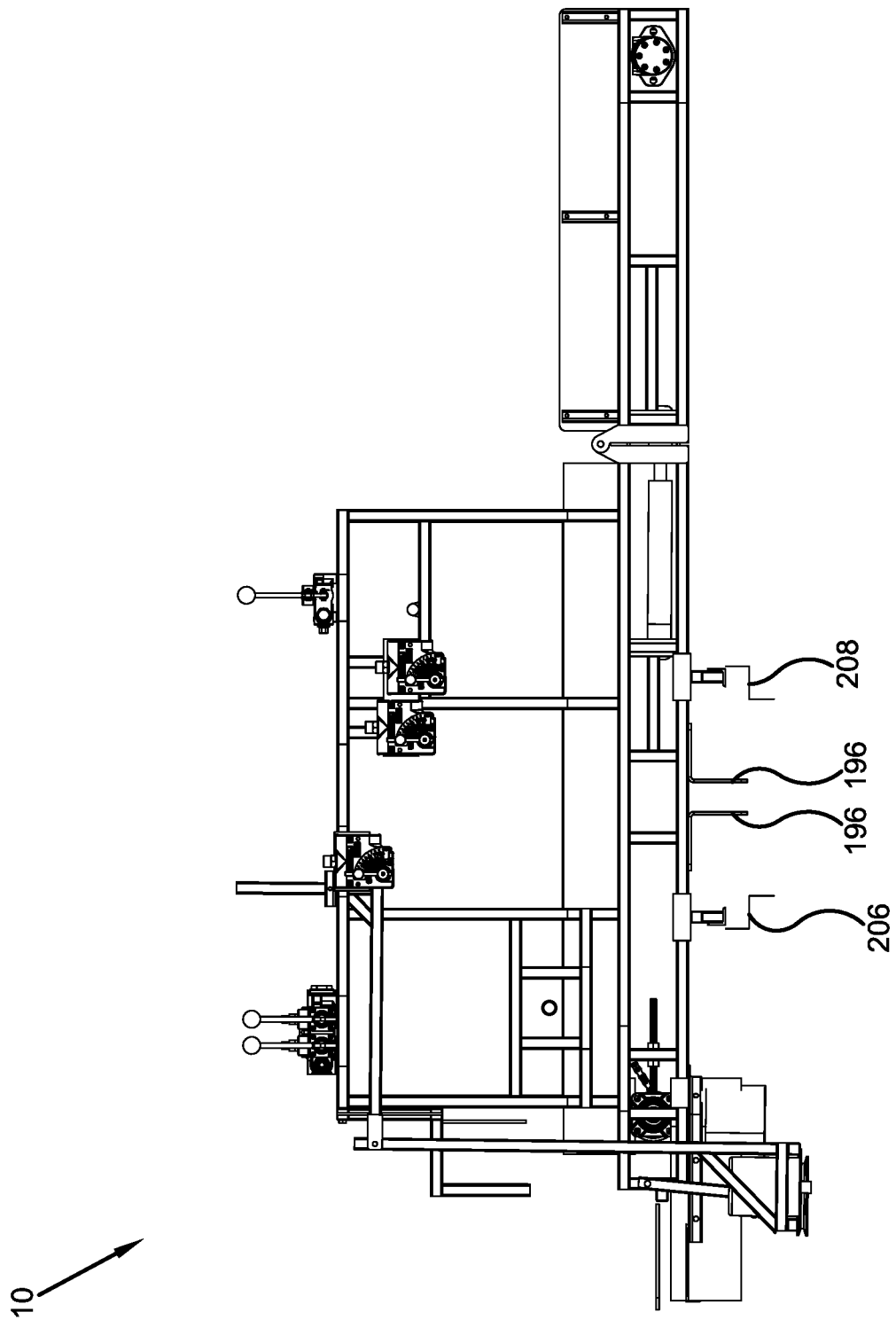
FIG. 24 is a back view of the exemplary accessory showing the exemplary means of connecting the accessory to the self-propelled landscaping device.
Figure 25:
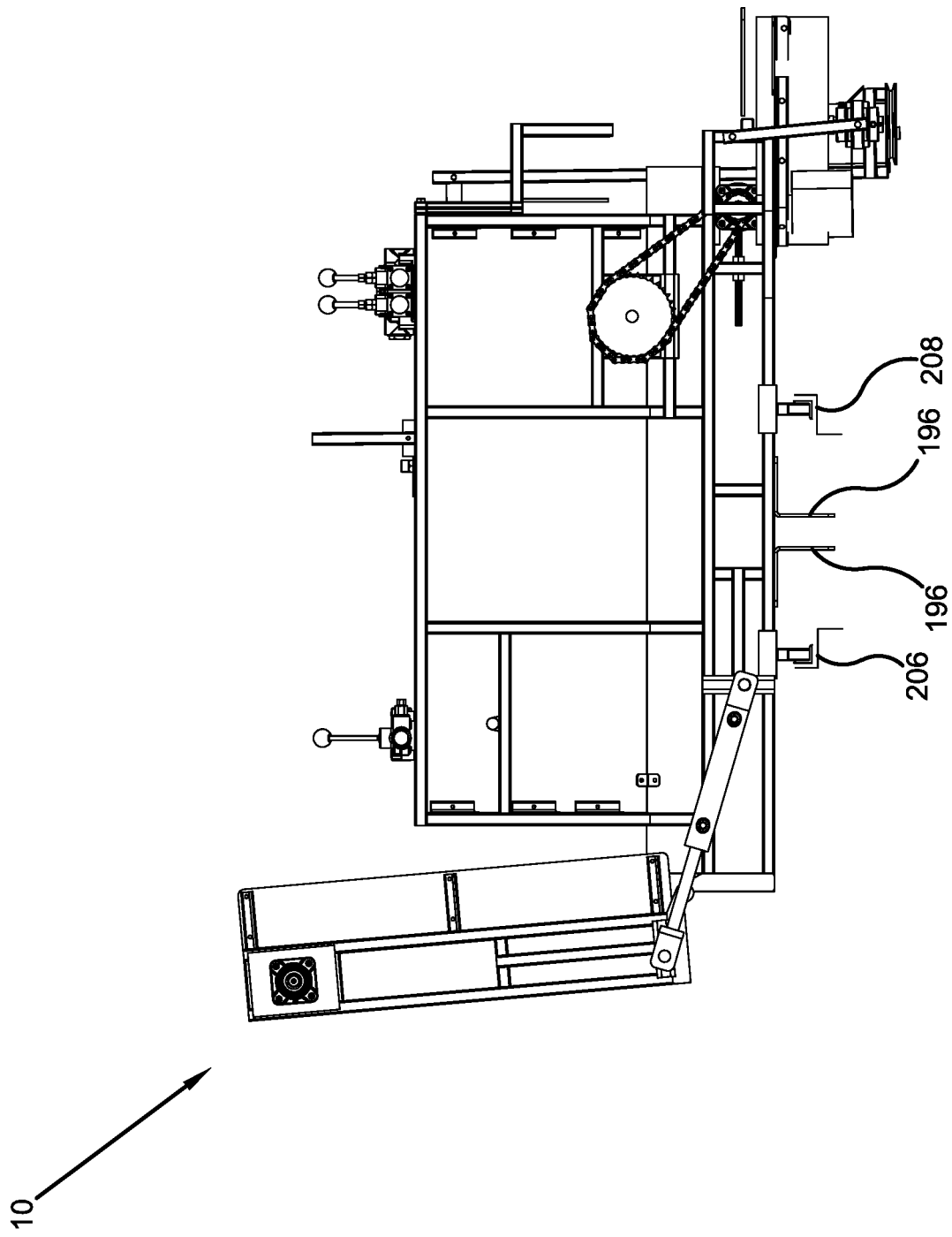
FIG. 25 is a front view of the exemplary accessory showing the exemplary means of connecting the accessory to the self-propelled landscaping device.

In some exemplary arrangements, the exemplary accessory 10 includes components which comprise an exemplary hydraulic system 158 shown schematically in FIG. 21. The exemplary hydraulic system is operative to cause movement of the conveyor 36, conveyor extension 82, the spreader 122. Further in alternative arrangements including the alternative conveyor extension 96 with the further conveyor 98, the hydraulic system 158 may also be operative to cause movement of the further conveyor 98. In exemplary arrangements, the hydraulic system 158, includes components mounted on the accessory 10 and components mounted on the self-propelled landscaping device 16. In exemplary arrangements of the hydraulic system 158, the exemplary system is in operative connection with an engine which is alternatively referred to herein as a drive or motor 160, of the self-propelled landscaping device 16. The exemplary motor 160 is in operative connection with the hydraulic pump 114 that is mounted on the self-propelled landscaping device 16. In exemplary arrangements, the operative connection of the motor 160 and the hydraulic pump 114 is operative to cause hydraulic fluid from the hydraulic pump 114 to move through a hydraulic fluid line 162 in a first hydraulic fluid line direction indicated at arrow 164. A pressure gauge 166 is in operative connection with the hydraulic fluid line 162 and is operative to indicate the pressure of the hydraulic fluid within the hydraulic fluid line 162.

In exemplary arrangements of the hydraulic system 158, the fluid line 162 is in fluid connection with a quick disconnect hydraulic fitting 168 that enables the fluid line 162 to be connected to the components of the hydraulic system 158 included on the accessory 10. A further quick disconnect hydraulic fitting 186 provides the return for the hydraulic fluid from the components on the accessory. The fittings also enable the hydraulic components on the accessory to be quickly and easily connected to and disconnected from the components of the hydraulic system included on the landscaping device 16. The fluid line 162 is in further operative connection with a spreader control valve 170, a conveyor control valve 172 and a conveyor extension control valve 174. The valves 170, 172, and 174 are variable and in some arrangements reversible flow valves that enable the flow of hydraulic fluid through the valve to be selectively varied and controlled thereby controlling on/off status as well as the speed and direction of hydraulic motors in operative connection therewith. However, as can be appreciated, the valves 170, 172, and 174 described herein are merely exemplary, and in other exemplary arrangements of the hydraulic system 158, other types of valve and control arrangements may be used.

A manually movable spreader control lever 176 is in operative connection with the spreader control valve 170. A conveyor control lever 178 is in operative connection with the conveyor control valve 172, and a conveyor extension control lever 180 is in operative connection with the conveyor extension control valve 174. The exemplary levers 176, 178, and 180 are in operative connection with their respective valves. The levers are in operatively supported connection with the accessory 10, and are each manually operable to control the flow rate and direction through the respective valve. The levers enable manual control of the flow of hydraulic fluid through the respective valve, and responsive thereto, the speed (and direction) of the at least one hydraulic motor in operative connection therewith.

Of course it should be understood that this arrangement is exemplary and in other arrangements a single motor may be used to power multiple components. This may be done in some arrangements through the use of suitable clutches or other power transmission devices. Alternatively in some arrangements at least two motors may be configured to operate concurrently. For example in some arrangements a motor operating the mixer may operate concurrently with the motor operating the conveyor that carries the bulk material away from the lower opening of the hopper. Further in other exemplary arrangements a single motor may be operative to provide rotational motion to at least two devices. For example in some arrangements a single hydraulic motor may provide rotational motion that is operative to cause movement of the mixing member and the conveyor that extends below the hopper. In other exemplary arrangements a single hydraulic motor may be utilized to provide power to each of the conveyors, spreaders, mixing members and other components such that they may operate concurrently. Of course it should be understood that these approaches are exemplary and that in other arrangements other approaches may be used.

In exemplary arrangements of the hydraulic system 158, the hydraulic fluid line 162 in operative connection with the spreader control valve 170 is in operative fluid connection with the spreader motor 136. The hydraulic fluid line 162 is also in operative fluid connection with the conveyor control valve 172 and the conveyor motor 74. The hydraulic fluid line 162 is also in operative fluid connection with the conveyor extension control valve 174 and the conveyor extension motor 112. In exemplary arrangements, the motors 136, 74, and 112 comprise hydraulic motors that are operative to convert the fluid power of the hydraulic fluid that flows through the fluid line 162 into mechanical energy that is operative to cause selective movement to the conveyor 36, the conveyor extension 82, and the spreader members 126 of the spreader 122. In exemplary arrangements, the levers 176, 178, and 180 are manually actuatable and controllable by a user of the self-propelled landscaping device to selectively vary the rotational speed (and in some arrangements direction) of the spreader members 126, to selectively vary the direction and speed of the conveyor 36 in the first and second directions 42 and 44, and to selectively cause movement of the conveyor extension 82 between the downward position 106 and upward position 108, as well as in some exemplary arrangements that include the slidably movable conveyor extension 82, 96, the inward and outward movement thereof.

In exemplary arrangements of the hydraulic system 158, hydraulic fluid that is passed through the motors 136, 74, and 112 returns from the motors through respective hydraulic fluid lines 162 and flows in a return direction indicated at arrow 182 to a hydraulic fluid reservoir or tank 184. In exemplary arrangements, the hydraulic fluid return line quick disconnect fitting 186 is in operative connection with the fluid line between the motors 136, 74, and 112 and the hydraulic fluid reservoir 184.

In exemplary arrangements of the hydraulic system 158, the fluid line 162 includes at least one pressure relief valve 188 in operative connection therewith. The pressure relief valve 188 is operative to enable pressure within the hydraulic fluid line 162 to be released in situations where the pressure of the hydraulic fluid within the line 162, or a portion thereof, is above a set threshold at which the pressure of the hydraulic fluid may cause damage to the various components of the hydraulic system 158 or portions of the line 162 itself such as hose portions.

Still further, alternative exemplary arrangements of the hydraulic system 158, may further include an additional valve 190, lever 192, and motor 194 that are in operative connection with the fluid line 162 and that are configured to control and cause selective movement of the further conveyor 98 of the alternative conveyor extension 96. The exemplary valve 190, lever 192, and motor 194 may be similar to the previously described conveyor valve 172, the conveyor lever 178, and the conveyor motor 74.

As previously discussed, although the conveyor 36, the conveyor extension 82, the spreader 122, and the optional further conveyor 98 have been discussed herein as being caused to be moved by at least one hydraulic motor of the exemplary hydraulic system 158, it should be understood that in other arrangements other means for causing movement of these components of the accessory 10 may be used. For example, an electrical or pneumatic drive system with suitable clutches, switches and valves, as well as electrically driven motors and pneumatically driven motors may be used in association with the components of the accessory 10. However, these other means for causing movement of the components of the accessory 10 are merely exemplary, and in other arrangements, other approaches for causing movement of the components of the accessory 10 may be used.

Referring now to FIGS. 23-26, there is shown therein the exemplary accessory 10 as previously described. In exemplary arrangements, the accessory 10 is operatively releasably connectable to the self-propelled landscaping device 16. The exemplary accessory 10 is operatively connectable to the self-propelled landscaping device through suitable connecting means or fastening means, as previously discussed herein. For example, in exemplary arrangements, the frame 14 of the accessory 10 includes brackets with releasable pins and apertures for attaching the accessory 10 to the self-propelled landscaping device 16.

Figure 26:
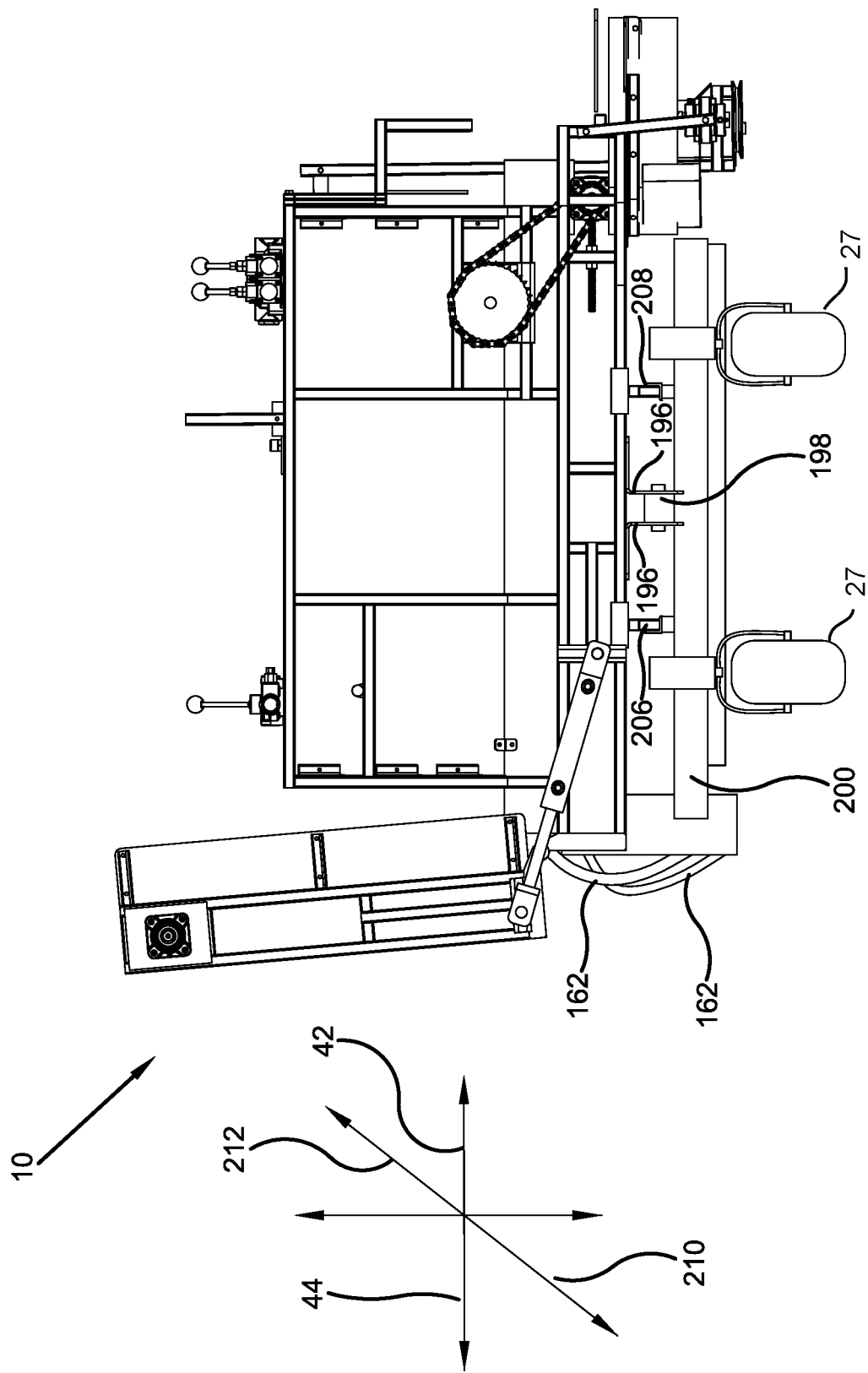
FIG. 26 is a front view of the exemplary accessory showing the exemplary means of connecting the accessory to the self-propelled landscaping device, as well as portions of an exemplary self-propelled landscaping device.

In exemplary arrangements, the exemplary accessory 10 is operatively attachable to the self-propelled landscaping device through suitable mounts and brackets that releasibly connect the frame 14 and the structure of self-propelled landscaping device. In exemplary arrangements, the frame 14 includes connecting ears 196 in operatively fixed connection therewith. The exemplary connecting ears 196 are operative to engage the accessory 10 and the self-propelled landscaping device 16 and hold the accessory 10 in operative connection therewith during operation. In exemplary arrangements, the ears 196 are operative to extend in lateral surrounding relation of a drawbar 198 in operatively supported connection with a frame 200 of the self-propelled landscaping device 16, as most clearly shown in FIG. 36. In exemplary arrangements, the connecting ears 196 each include a respective ear opening 202. The exemplary ear openings 202 are configured to be in aligned relation with a drawbar opening (not shown) such that a locking pin 204 is enabled to extend through the ear openings and the drawbar opening to fix the accessory 10 in an operative position on the self-propelled landscaping device 16. In exemplary arrangements, a nut and bolt arrangement, or any other suitable fastener arrangement may be used to hold the connecting ears 196 in engaged relation with the self-propelled landscaping device 16. In the operative position of the accessory 10 on the self-propelled landscaping device, the first direction 42 and the second direction 44 in which bulk material may be moved from the hopper extend generally perpendicularly to the forward movement direction indicated by arrow 210 and the backward movement direction indicated by arrow 212 of the self-propelled landscaping device 16, as shown in FIG. 26.

In some exemplary arrangements, the accessory 10 may be further secured to the self-propelled landscaping device 16 by mounting brackets 206 and 208. The exemplary mounting brackets are configured to be operatively releasably connectable to the frame 200 of the self-propelled landscaping device 16 at portions of the frame 200 that are disposed outward of the drawbar 198 in the first direction 42 and second direction 44. The exemplary mounting brackets 206 and 208 are comprised of similar materials as the connecting ears 196. In alternative exemplary arrangements, the mounting brackets 206 and 208 may be in fixed operative connection with the frame 14, and are configured to be operatively releasably connected to the frame 200 of the self-propelled landscaping device 16. The exemplary mounting brackets 206 and 208 have openings extending therethrough that are configured to be aligned with openings on the self-propelled landscaping device 16 such that the mounting brackets 206 and 208 may be operatively releasably connected to the self-propelled landscaping device 16 through a suitable connecting or fastening means, such as those previously discussed herein.

In the exemplary arrangement the accessory 10 is configured to be mounted in fixed operative connection with the self-propelled landscape device 16 in a position that is disposed in the forward direction 210 from the operator supporting step 17 of the landscape device. In this exemplary arrangement the hopper 18 which holds the bulk material extends in vertically overlying relation of at least one wheel 27 of the self-propelled landscape device. This exemplary arrangement provides for the weight associated with the bulk material to be supported by the underlying at least one wheel 27. The exemplary arrangement also enables the operator when positioned in standing relation on the step 17 to be able to view at least a portion of the interior area 20 of the hopper 18. This enables the operator to visually observe the amount of bulk material remaining as well as conditions that might prevent the bulk material from passing downward through the lower opening 32 of the hopper. Of course it should be understood that this arrangement is exemplary and in other arrangements other configurations may be used.

In alternative exemplary arrangements, the exemplary ears 196 and mounting brackets 206 and 208 may be selectively positionable on the frame 14 in order to enable the accessory to be attached to self-propelled landscaping devices of different makes and models. For example, in such arrangements, the frame 14 may include a plurality of openings or attachment areas in order to enable the ears 196 and the mounting brackets 206 and 208 to be engaged with frame portions of different types of self-propelled landscaping devices. In other exemplary arrangements, the ears 196 and the brackets 206 may be in operative connection with a guide rail structure on the frame 14 in which the ears 196 and the brackets 206 and 208 may be slidably moved and positioned relative to the frame 14 to engage frame portions or structures of different types of self-propelled landscaping devices. However, in some exemplary arrangements, the accessory 10 or portions thereof, may be integrated with or may be permanently a part of the self-propelled landscaping device 16.

Figure 27:
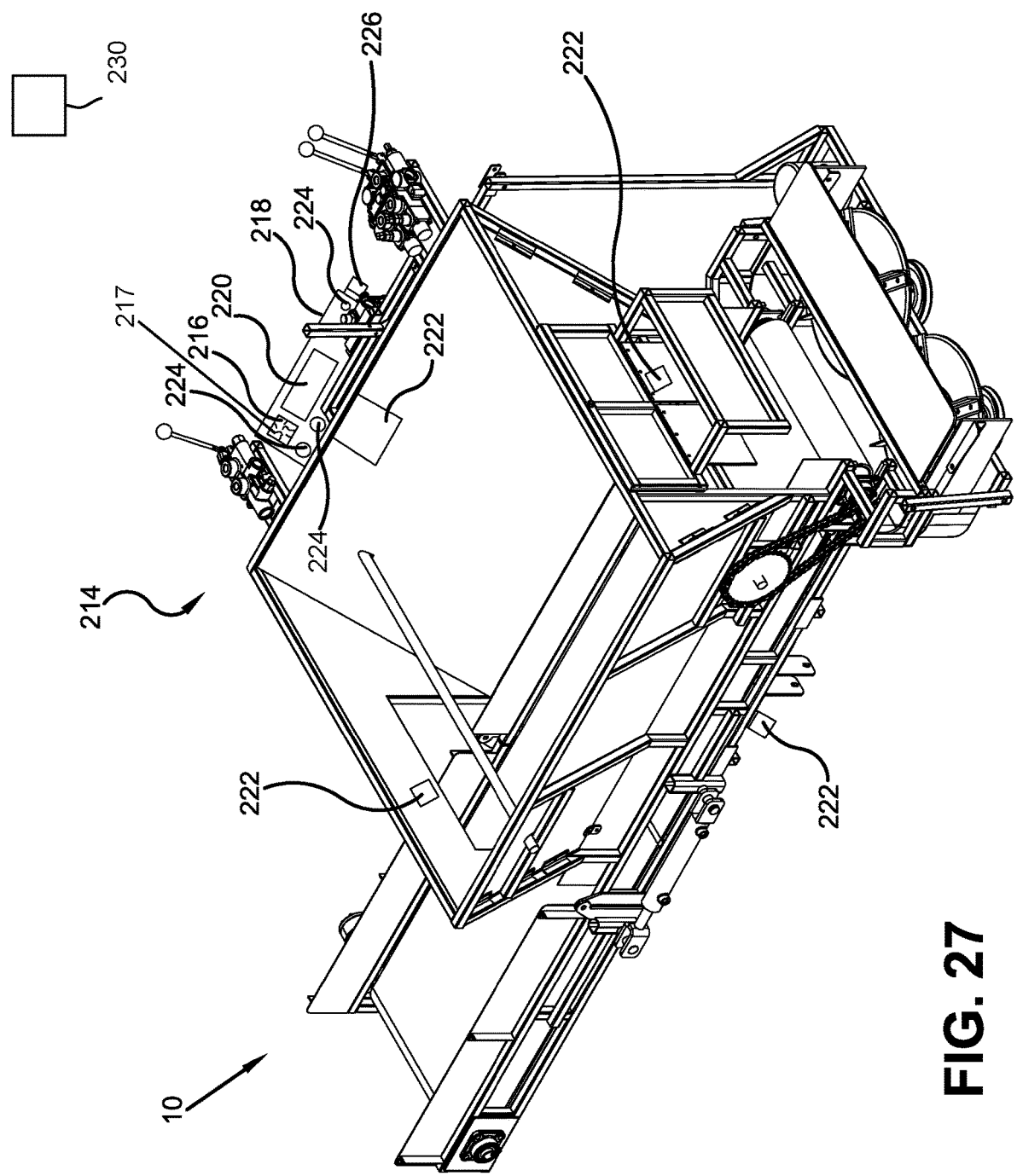
FIG. 27 is a front top right perspective view of the exemplary accessory showing components of an exemplary electrical circuit.

Now referring to FIG. 27, there is shown therein an alternative exemplary arrangement 214 including the accessory 10 as previously described herein. The exemplary accessory 10 may further include at least one circuit 216. The exemplary at least one circuit includes a controller 217. The exemplary controller includes circuitry which is operative to communicate electrical signals which may be used to determine conditions, provide outputs and/or control devices that are included on the accessory. In the exemplary arrangement the at least one controller 217 includes at least one processor and at least one data store. In exemplary arrangements the processor may include a processor suitable for carrying out circuit executable instructions that are stored in the at least one data store. The at least one processor may include or be in operative connection with a nonvolatile storage medium including instructions that include a basic input/output system (BIOS) or other suitable interfaces. For example the at least one processor may correspond to one or more of the combination of a CPU, FPGA, ASIC or other integrated circuit or other type of circuit that is capable of processing data and instructions. The data stores may correspond to one or more of volatile or nonvolatile memory such as random access memory, flash memory, magnetic memory, optical memory, solid-state memory or other media that are operative to store non-transitory circuit executable instructions and data. Circuit executable instructions that may be carried out through operation of the at least one processor may include instructions in any of the plurality of programming languages and formats including, without limitation, routines, subroutines, programs, threads of execution, objects, scripts, methodologies and functions which carry out the actions such as those described herein. Structures for such processors and data stores may include, correspond to and utilize the principles described in the textbook entitled Microprocessor Architecture, Programming and Applications with the 8085 by Ramesh S. Gaonker, Sixth Edition (Penram International Publishing 2013) which is incorporated herein by reference in its entirety. Of course these structures and arrangements are exemplary and in other arrangements other approaches may be used.

The exemplary controller 217 is in operative connection with a control panel 218. The exemplary control panel 218 includes a display screen 220 in operative connection therewith which is alternatively referred to as a display. The exemplary at least one circuit 216 further includes at least one sensor 222. The exemplary at least one sensor 222 may be operative to sense at least one property of the bulk material. For example at least one sensor may be operative to sense a quantity of material that is present within the interior area 20 of the hopper 18. This may include for example at least one of a photosensor, optical sensor, Lidar and/or ultrasonic sensor or other sensors that provide signals usable to determine a level or volume of material in the hopper. Alternatively such sensors may include weight sensors or load cells that sense at least one property corresponding to mass of the bulk material. Alternatively at least one sensor may be operative to sense a property of the bulk material that is indicative of a quantity of material that passes from the conveyor 36 to the conveyor extension 82. Alternatively at least one sensor may be operative to sense a property of the bulk material that is indicative of the rate, volume, density or other property indicative of quantity of bulk material that passes from the lower opening of the hopper. The at least one sensor may alternatively or in addition sense at least one property of the bulk material that passes from the conveyor 36 to the spreader 122 and/or at least one property of the material as it is spread. In exemplary arrangements, the at least one sensor 222 may comprise one or more of weight sensors, load sensors, optical sensors, infrared sensors, Lidar sensors, ultrasonic sensors, or other sensor types that detect properties of the bulk material that provide signals that can be used by the controller to electronically determine one or more quantity values. For example, the controller may determine a quantity of bulk material present within the interior area 20 of the hopper 18, a quantity of bulk material received in the hopper, a quantity of bulk material discharged from the hopper in either the first direction 42 or the second direction 44, a quantity of bulk material that is spread by the spreader members and a quantity of bulk material discharged from the conveyor. In exemplary arrangements the at least one controller may be operative to determine such quantity values and also determine such quantities in correlated relation with time values as determined through operation of at least one clock function that is included in the controller. In other arrangements the controller may determine location data such as via GPS circuitry, and store such quantity data in correlated relation with location data. In exemplary arrangements the at least one controller may be operative to store such data in at least one data store to provide records of bulk material types and quantities that are utilized in connection with landscaping jobs or portions thereof that are carried out using the accessory. Of course these approaches are exemplary of numerous different types of data that may be determined, stored and utilized in connection with exemplary arrangements.

In some exemplary arrangements, visual indicia corresponding to the quantity of bulk material present within the interior area 20 of the hopper 18, and the quantity of bulk material discharged from the hopper 18 and used during at least one time period is displayed on the display screen 220. In alternative exemplary arrangements, the control panel 218 may include at least one button or other input device 224 that is manually operable to set a specific quantity of bulk material to be discharged from the hopper 18 in the first direction 42 or the second direction 44. The controller may operate in accordance with its circuit executable instructions to cause the accessory to operate to discharge the bulk material in accordance with such inputs. Still further, in alternative exemplary arrangements in which the lower opening 32 of the hopper 18 is configured to be varied in area via suitable structures and actuators as previously described herein, the controller and control panel 218 or other input devices may be in operative connection with the structures and actuators, that operate to vary the area of the lower opening 32, and cause a selected volume of bulk material to be discharged through the lower opening 32. This may enable bulk material to be spread at a specific rate or depth corresponding to the volume of bulk material discharged through the lower opening, or may enable accurate control of the amount or rate bulk material discharged from the outward end 86 of the conveyor extension 82.

In exemplary arrangements, the controller 217 may be in operative connection with sensors that are operative to sense the condition of the levers 176, 178, 180, or other devices connected in the hydraulic system 158. The controller may also be operative to control and/or monitor portions of the hydraulic system 158 and display output indicia corresponding to the status of the components of the hydraulic system 158 on the display screen 220. In further alternative exemplary arrangements, the at least one 216 may include or be in operative connection with a wireless transmitter 226. In such exemplary arrangements, the transmitter 226 may be operative responsive to the controller 217 to wirelessly send at least one message to a remote electronic system or circuit 230 including data corresponding to determined quantity information of the types discussed above or other information or other data stored in a data store of the circuit 216. The data transmitted in wireless messages may correspond to monitoring information or statuses of the various components of the exemplary accessory 10. Alternatively or in addition the wireless messages wireless transmitter may include data corresponding to location data such as GPS locations of the exemplary accessory 10, at least one quantity of bulk material distributed that is determined by the at least one circuit, responsive to sensors 222 and other information corresponding to operation or use of the exemplary accessory 10.

In some exemplary arrangements the at least one circuit may be operative to provide this data to at least one remote system 230 on a continuous basis and or on a programmed time basis. Further in other exemplary arrangements the at least one control circuit associated with the accessory may be operable in accordance with its programmed instructions to store in the at least one data store associated with the controller 217, numerous different types of data corresponding to types and quantities of bulk materials received and/or discharged by the accessory, location data, time data, operation data or other types of data. Such stored data may be wirelessly provided from the at least one circuit of the accessory responsive at least in part to at least one wirelessly received query message from a remote system.

Alternatively or in addition exemplary arrangements may enable the circuitry associated with the accessory to store one or more of types and quantity data associated with the bulk material, location data and/or other operational data associated with the accessory and enable such data to be provided to a mobile wireless device or other computing device associated with the operator of the accessory. Such data may be utilized through operation of an application that operates on the device, or other computerized system to enable determinations of associated charges for bulk material that is provided, labor time associated with the accessory operator, or other information to be determined and calculated for purposes of invoicing of customers, payment of landscaping employees or other related purposes. Numerous different types of data may be provided by the at least one circuit associated with the accessory to mobile wireless devices or other local or remote systems.

Such arrangements may be useful for landscaping companies that deliver and/or spread large quantities of bulk material at different properties or facilities from one or multiple sources. The ability to accurately track the quantity of bulk material used, and the locations of use, the labor involved and other data may facilitate the accurate billing of customers for the quantity of bulk material used at their property. Of course, as can be appreciated, entities other than landscaping companies may also benefit from such exemplary arrangements and capabilities that may be provided in connection with accessory 10.

Thus, the exemplary arrangements described herein achieve improved operation, eliminate difficulties encountered in the use of prior devices and systems, and attain the useful results as described herein.

In the foregoing description, certain terms have been used for brevity, clarity and understanding. However, no unnecessary limitations are to be implied therefrom because such terms are used for descriptive purposes only and are intended to be broadly construed. Moreover, the descriptions and illustrations herein are by way of examples, and the new and useful features and arrangements are not limited only to the features shown and described.

It should be understood that features and/or relationships shown in relation with one arrangement can be combined with features and/or relationships of another arrangement. That is, various features and/or relationships from various arrangements can be combined in further arrangements. The inventive scope of the disclosure is not limited to only the exact arrangements shown or described herein.

Having described the features, discoveries, and principles of the exemplary arrangements, the manner in which they are constructed and operated and the advantages and useful results attained; the new and useful structures, devices, elements, arrangements, parts, combinations, systems, equipment, operations, methods, processes, and relationships are set forth in the appended claims.

I claim:

1. Apparatus comprising:
   an accessory configured to be releasably operatively connected to a self-propelled landscaping device, the accessory comprising:
   a frame that is configured to be operatively releasably connected to the self-propelled landscaping device,
   a hopper, wherein the hopper
      is in operatively supported connection with the frame, and is configured to hold solid bulk material in an interior area thereof,
      includes at least one wall, wherein the at least one wall bounds the hopper interior area, wherein in an operative position the at least one wall further bounds an upper opening for receiving bulk material into the interior area, and a lower opening for discharging the bulk material from within the interior area,
   at least one movable conveyor, wherein in the operative position, the at least one movable conveyor is in operatively supported connection with the frame and extends horizontally and below the hopper, wherein the at least one movable conveyor includes a first end and a second end opposed of the first end, wherein the at least one movable conveyor is selectively movable in
- a first direction, wherein bulk material discharged from the lower opening of the hopper is moved in engagement with the at least one conveyor in the first direction toward the first end of the at least one conveyor, and
- a second direction, wherein bulk material discharged from the lower opening of the hopper is moved in engagement with the at least one conveyor in the second direction toward the second end of the at least one conveyor, at least one rotatable spreader member,
- wherein the at least one rotatable spreader member is in operatively supported rotatable connection with the frame and is disposed from the hopper in the first direction,
- wherein the at least one rotatable spreader member includes a plurality of projections that are configured to engage and propel bulk material that has been moved by the at least one conveyor in the first direction away from the first end, a conveyor extension,
- wherein the conveyor extension is movably mounted in operatively supported connection with the frame,
- wherein the conveyor extension includes
  - an inward end, wherein the inward end is operative to receive bulk material from the second end, and
  - an outward end, wherein the outward end is selectively positionable horizontally outward in the second direction away from the second end,
- wherein bulk material from the hopper that is moved in the second direction to the second end of the at least one conveyor is engaged with the conveyor extension at the inward end and is moved in engagement with the conveyor extension to the outward end at which the material is discharged.

2. The apparatus according to claim 1
wherein the movable conveyor extension is movable relative to the frame between an extended position and a retracted position,
  wherein in the extended position, the outward end of the conveyor extension is positioned further horizontally outward in the second direction away from the hopper, than when the conveyor is in the retracted position.

3. The apparatus according to claim 1
wherein the at least one rotatable spreader member includes at least one rotatable spreader disc,
  wherein the plurality of projections includes a plurality of radially extending projections that extend upward on the at least one spreader disc,
  wherein bulk material at the first end falls onto the at least one spreader disc.

4. The apparatus according to claim 1, and further comprising:
at least one movable mixer member, wherein the mixer member
  is in operatively supported movable connection with the at least one wall of the hopper,
  extends within the interior area of the hopper, and
  is operative to cause bulk material within the interior area of the hopper to move responsive to movement of the mixer member.

5. The apparatus according to claim 1, and further comprising:
at least one selectively operable motor,
  wherein the at least one motor is in operative connection with at least one of
    the at least one movable conveyor,
    the at least one rotatable spreader member, and
    the conveyor extension,
  wherein responsive to selective operation of the motor, the motor is operative to cause selective movement of at least one of the at least one of movable conveyor, the at least one rotatable spreader member, and the conveyor extension.

6. The apparatus according to claim 1
wherein the at least one movable conveyor comprises
  a belt,
    wherein the belt comprises a continuous loop of durable material, and includes an interior surface and an opposed exterior surface,
    wherein in the operative position at least a portion of the exterior surface of the belt is in facing relation with the lower opening area of the hopper,
  at least two selectively rotatable belt support pulleys,
    wherein the at least two selectively rotatable pulleys include
      a first pulley, wherein the first pulley is in operatively supported rotatable connection with the frame below the lower opening of the hopper and is operatively positioned at the first end of the conveyor,
      a second pulley, wherein the second pulley is in operatively supported rotatable connection with the frame below the lower opening of the hopper and is operatively positioned at the second end of the conveyor,
    wherein the interior surface of the belt is in contacting, partially surrounding relation with the first and second pulleys and extends therebetween,
    wherein each of the first and second pulleys is selectively rotatable in a first rotational direction and in a second rotational direction opposed of the first rotational direction,
      wherein the portion of the belt is caused to move in the first direction responsive to rotation of at least one of the first and second pulleys in the first rotational direction, and
      wherein the portion of the belt is caused to move in the second direction responsive to rotation of the at least one of the first and second pulleys in the second rotational direction.

7. The apparatus according to claim 1
wherein the conveyor extension includes a further conveyor portion, wherein the further conveyor portion
  is in operatively supported connection with the conveyor extension,
  extends in the second direction from the second end of the at least one conveyor to the outward end of the conveyor extension, and
  is selectively movable to cause bulk material in engagement therewith to be disengaged from the further conveyor portion at the outward end.

8. The apparatus according to claim 1, and further comprising,
  at least one motor,
    wherein the at least one motor is in operative connection with at least one of
      the at least one movable conveyor,
      the at least one rotatable spreader member, and
      the conveyor extension,
  at least one manually actuatable lever, wherein the at least one lever
    is in operatively supported connection with the accessory,
    is in operative connection with the at least one motor, and
    is selectively manually actuatable to cause operation of the motor,
      wherein responsive to manual actuation of the lever, the motor is operative to cause selective movement of at least one of the at least one movable conveyor, the at least one rotatable spreader member, and the conveyor extension.

9. The apparatus according to claim 1, and further comprising:
  at least one movable mixer member, wherein the at least one mixer member
    is in operative supported connection with the at least one wall of the hopper,
    extends within the interior area of the hopper, and
    is in operative connection with the at least one movable conveyor,
  wherein responsive to movement of the movable conveyor in either the first direction or the second direction, the at least one mixer member is operative to move within the hopper interior area,
    wherein responsive to movement of the mixer member, bulk material within the interior area of the hopper is caused to move.

10. The apparatus according to claim 1, and further comprising:
  at least one motor,
    wherein the at least one motor is in operatively supported connection with the accessory,
  at least one movable mixer member, wherein the at least one mixer member
    is in operatively supported connection with the at least one wall of the hopper,
    extends within the interior area of the hopper, and
    is operative to cause bulk material within the interior area of the hopper to move responsive to movement of the mixer member,
  wherein the at least one motor is in operative connection with at least one of
    the at least one movable conveyor,
    the at least one rotatable spreader member,
    the conveyor extension, and
    the at least one movable mixer member,
  wherein the motor is selectively operative to cause selective movement of the at least one of the at least one movable conveyor, the at least one rotatable spreader member, the conveyor extension, and the mixer member.

11. The apparatus according to claim 1
  wherein the at least one movable conveyor comprises
    a belt,
      wherein the belt comprises a continuous loop of durable material, and in the operative position includes an upper run and a lower run, wherein the upper run is disposed vertically above the lower run, and wherein at least a portion of the upper run is in facing relation with the lower opening of the hopper,
    at least two selectively rotatable pulleys, wherein the at least two selectively rotatable pulleys include
      a first pulley, wherein the first pulley is in operatively supported rotatable connection with the frame and is operatively positioned at the first end of the conveyor,
      a second pulley, wherein the second pulley is in operatively supported rotatable connection with the frame and is operatively positioned at the second end of the conveyor,
    wherein the belt is in contacting, partially surrounding relation of the first pulley and second pulley, and extends horizontally between the first and second pulley,
    wherein at least one of the first and second pulleys is selectively rotatable in each of a first rotational direction and in a second rotational direction opposed of the first rotational direction,
      wherein the upper run is caused to move in the first direction responsive to rotation of the at least one of the first and second pulleys in the first rotational direction, and
      wherein the upper run is caused to move in the second direction responsive to rotation of the at least one of the first and second pulleys in the second rotational direction,
    wherein bulk material discharged from the interior area of the hopper through the lower opening onto the upper run is caused to be moved in either the first direction or the second direction responsive to selective rotation of the first and second pulleys.

12. The apparatus according to claim 1,
  wherein the conveyor extension is selectively movable relative to the frame between
    a non-operational position wherein the outward end is disposed vertically upward above the inward end, and
    an operational position wherein the outward end disposed substantially horizontally from the inward end.

13. The apparatus according to claim 1, and further comprising:
  at least one motor, wherein the at least one motor comprises
    a hydraulic motor, wherein the hydraulic motor,
      is configured to be in operatively releasable fluid connection with a hydraulic pump that is operatively connected to a drive of the self-propelled landscaping device,
      is in operative connection with at least one of
        the at least one movable conveyor,
        the at least one rotatable spreader member, and
        the conveyor extension,
      wherein the hydraulic motor is selectively operative to cause selective movement of at least one of the at least one movable conveyor, the at least one rotatable spreader member, and the conveyor extension.

14. The apparatus according to claim 1, and further comprising
  at least one motor,
    wherein the at least one motor comprises a hydraulic motor, wherein the hydraulic motor is configured to be in operatively releasable fluid connection with a hydraulic pump that is operatively connected to a drive of the self-propelled landscaping device, at least one movable mixer member, wherein the at least one mixer member
is in operatively supported connection with the at least one wall of the hopper,
extends within the interior area of the hopper, and
is operative to cause bulk material within the interior area of the hopper to move responsive to movement of the mixer member, wherein the conveyor extension includes a further conveyor, wherein the further conveyor
is in operatively supported connection with the conveyor extension,
extends in the second direction away from the second end of the at least one conveyor to the outward end of the conveyor extension,
is selectively movable to cause bulk material in engagement with the conveyor extension to be moved from the inward end in the second direction and disengaged from the conveyor extension at the outward end, wherein the hydraulic motor is in operative connection with at least two of
the at least one movable conveyor,
the further conveyor,
the at least one rotatable spreader member, and
the at least one movable mixer member, wherein the motor is selectively operative to cause selective movement of the at least two of the at least one movable conveyor, the further conveyor, the at least one rotatable spreader and the mixer member.

15. The apparatus according to claim 1,
wherein the accessory includes
at least one circuit, wherein the at least one circuit includes in operative connection therewith
at least one data store, wherein the at least one data store is operative to store circuit executable instructions and data, and
at least one sensor, wherein the at least one sensor is operative to sense at least one property of the bulk material
wherein the at least one circuit in operative responsive at least in part to the at least one sensor to determine at least one of
a quantity of bulk material received in the interior area of the hopper,
a quantity of bulk material discharged from the interior area of the hopper,
a quantity of bulk material spread by the at least one rotatable spreader member, and
a quantity of bulk material discharged from the outward end of the conveyor extension.

16. The apparatus according to claim 1,
wherein the accessory includes
at least one circuit, wherein the at least one circuit includes in operative connection therewith
at least one data store,
at least one display screen, wherein the at least on display screen is operative to output indicia on the display screen,
at least one sensor, wherein the at least one sensor is operative to sense at least one property of the bulk material,
wherein the at least one circuit is operative responsive at least in part to the at least one sensor to determine at least one of
a quantity of bulk material held in the interior area of the hopper,
a quantity of bulk material discharged from the interior area of the hopper,
a quantity of bulk material spread by the at least one rotatable spreader member, and
a quantity bulk material discharged from the outward end of the conveyor extension,
wherein the at least one circuit is operative to cause indicia corresponding to the at least one determined quantity to be output on the display screen.

17. The apparatus according to claim 1,
wherein the accessory includes
at least one circuit, wherein the at least one circuit includes in operative connection therewith
at least one data store, wherein the at least one data store is operative to store circuit executable instructions and data,
at least one transmitter, wherein the at least one transmitter is operative to send wireless messages to at least one remote circuit,
at least one display screen, wherein the at least one display screen is operative to output indicia on the display screen, and
at least one sensor, wherein the at least one sensor is operative to sense at least one property of the bulk material,
wherein the at least one circuit is operative responsive at least in part to the at least one sensor to cause a determination of at least one of
a quantity of bulk material held in the interior area of the hopper,
a quantity of bulk material discharged from the interior area of the hopper,
a quantity of bulk material spread by the at least one rotatable spreader member, and
a quantity of bulk material discharged from the outward end of the conveyor extension,
wherein the at least one circuit is operative to cause at least one of
data corresponding to the at least one determined quantity to be stored in the at least one data store,
indicia corresponding to the at least one determined quantity to be output on the display screen, and
at least one wireless message including data corresponding to the at least one determined quantity to be sent by the at least one transmitter to the at least one remote circuit.

18. The apparatus according to claim 1
wherein the landscaping device includes at least one wheel,
wherein in the operative position of the accessory the hopper extends in vertically overlying relation of the at least one wheel.

19. The apparatus according to claim 1
wherein the landscaping device comprises a stand on step configured to support an operator during device operation,
wherein the landscaping device includes at least one wheel, wherein the at least one wheel is disposed in a forward operating direction of the device from the step, wherein in the operative position of the accessory the hopper extends in vertically overlying relation of the at least one wheel and in the forward operating direction from the step.

20. Apparatus comprising:
an accessory configured to be releasably operatively connected to a self-propelled landscaping device, the accessory comprising:
a frame, wherein the frame is releasably operatively engageable in fixed connection with the landscaping device,
a hopper, wherein in an operative position of the accessory the hopper
is in operatively supported connection with the frame and is configured to hold solid bulk material in an interior area thereof,
includes an upper opening to the interior area configured to receive bulk material into the interior area, and
includes a lower opening configured to pass the bulk material from the interior area,
a conveyor, wherein in the operative position the conveyor
is configured to move bulk material supported thereon,
extends underneath the lower opening of the hopper and horizontally along a conveyor direction that is perpendicular to a forward movement direction of the self-propelled device,
is selectively movable to cause bulk material that has passed out of the lower opening to be moved along the conveyor direction in engagement with the conveyor and discharged from the conveyor at either
a first conveyor end, wherein the first conveyor end is disposed along the conveyor direction away from underneath the lower opening of the hopper in a first direction, or
a second conveyor end, wherein the second conveyor end is disposed along the conveyor direction away from underneath the lower opening of the hopper in a second direction opposed of the first direction.

21. The apparatus according to claim 20
wherein the accessory further includes
a rotatable bulk material spreader disc, wherein the spreader disc is selectively operative to propel bulk material discharged at the first conveyor end,
a conveyor extension,
wherein the conveyor extension is movably mounted in operative supported connection with the frame,
wherein the conveyor extension includes
an inward end, wherein the inward end is configured to receive bulk material delivered by the conveyor at the second end, and
an outward end, wherein the outward end is configured to discharge bulk material from the conveyor extension,
wherein the outward end is selectively positionable relative to the inward end.

22. The apparatus according to claim 20
wherein the accessory includes
at least one circuit, wherein the at least one circuit includes in operative connection therewith
at least one data store, wherein the at least one data store is operative to store circuit executable instructions and data,
at least one display, wherein the at least one display is operative to output visible indicia,
at least one sensor, wherein the at least one sensor is operative to sense at least one property of the bulk material,
wherein the at least one circuit is operative responsive at least in part to the at least one sensor to cause a determination of at least one of
a quantity of bulk material held in the interior area of the hopper,
a quantity of bulk material passed from the interior area of the hopper,
a quantity of bulk material discharged from at least one of the first conveyor end and the second conveyor end,
wherein the at least one circuit is operative to cause at least one of
data corresponding to the at least one determined quantity to be stored in the at least one data store, and
indicia corresponding to the at least one determined quantity to be output on the display.

23. Apparatus comprising:
an accessory configured to be releasably operatively connected to a self-propelled landscaping device, the accessory comprising:
a frame, wherein the frame is releasably operatively engageable in fixed connection with the landscaping device,
a hopper, wherein in an operative position of the accessory the hopper
is in operatively supported connection with the frame and is configured to hold solid bulk material in an interior area thereof,
includes an upper opening to the interior area configured to receive bulk material into the interior area, and
includes a lower opening configured to pass the bulk material from the interior area,
a conveyor, wherein the conveyor
is configured to move bulk material supported thereon,
extends below the lower opening of the hopper,
is selectively movable to cause bulk material that has passed out of the lower opening to be moved in engagement with the conveyor and discharged from the conveyor at either
a first conveyor end, wherein the first conveyor end is disposed away from the lower opening of the hopper in a first direction, or
a second conveyor end, wherein the second conveyor end is disposed away from the lower opening of the hopper in a second direction opposed of the first direction,
a conveyor extension,
wherein the conveyor extension is movably mounted in operative supported connection with the frame,
wherein the conveyor extension includes
an inward end, wherein the inward end is configured to receive bulk material discharged from the conveyor at the second end, and
an outward end, wherein the outward end is configured to discharge bulk material from the conveyor extension,
wherein the outward end is selectively positionable relative to the inward end.

24. Apparatus comprising:
an accessory configured to be releasably operatively connected to a self-propelled landscaping device, the accessory comprising:

a frame, wherein the frame is releasably operatively engageable in fixed connection with the landscaping device, a hopper, wherein in an operative position of the accessory the hopper
- is in operatively supported connection with the frame and is configured to hold solid bulk material in an interior area thereof,
- includes an upper opening to the interior area configured to receive bulk material into the interior area, and
- includes a lower opening configured to pass the bulk material from the interior area, a conveyor, wherein the conveyor
- is configured to move bulk material supported thereon,
- extends below the lower opening of the hopper,
- is selectively movable to cause bulk material that has passed out of the lower opening to be moved in engagement with the conveyor and discharged from the conveyor at either
  - a first conveyor end, wherein the first conveyor end is disposed away from the lower opening of the hopper in a first direction, or
  - a second conveyor end, wherein the second conveyor end is disposed away from the lower opening of the hopper in a second direction opposed of the first direction, a stand on step configured to support an operator during device movement, at least one wheel, wherein the at least one wheel is disposed from the step in a forward operating direction of the device from the step, wherein in the operative position of the accessory the hopper extends in vertically overlying relation of the at least one wheel and in the forward operating direction from the step.

* * * * *